US012022274B2

(12) United States Patent
Chebiyyam et al.

(10) Patent No.: US 12,022,274 B2
(45) **Date of Patent: *Jun. 25, 2024**

(54) PARAMETRIC AUDIO DECODING

(71) Applicant: QUALCOMM Incorporated, San Diego, CA (US)

(72) Inventors: Venkata Subrahmanyam Chandra Sekhar Chebiyyam, Seattle, WA (US); Venkatraman Atti, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/210,632

(22) Filed: Jun. 15, 2023

(65) Prior Publication Data

US 2024/0031755 A1 Jan. 25, 2024

Related U.S. Application Data

(63) Continuation of application No. 17/409,749, filed on Aug. 23, 2021, now Pat. No. 11,716,584, which is a (Continued)

(51) Int. Cl.

*H04S 3/00* (2006.01)
*G10L 19/008* (2013.01)

(Continued)

(52) U.S. Cl.

CPC ............ *H04S 3/008* (2013.01); *G10L 19/008* (2013.01); *H04S 1/007* (2013.01);

(Continued)

(58) Field of Classification Search

CPC ...... H04S 3/008; H04S 1/007; H04S 2400/01; H04S 2420/03; H04S 2420/07; G10L 19/008; G10L 19/022; G10L 19/0204

See application file for complete search history.

(56) References Cited

U.S. PATENT DOCUMENTS 7,583,805 B2 9/2009 Baumgarte et al.
7,787,632 B2 8/2010 Ojanpera (Continued)

FOREIGN PATENT DOCUMENTS

CN 1655651 A 8/2005
CN 102169693 A 8/2011

(Continued)

OTHER PUBLICATIONS

Herre J., et al., "MPEG Surround—The ISO/MPEG Standard for Efficient and Compatible Multi-Channel Audio Coding," The Journal of the Audio Engineering Society Convention 122, Nov. 2008, pp. 932-955, vol. 56 (11), Accessed online Jul. 10, 2013, May 8, 2007.

(Continued)

*Primary Examiner* — David L Ton
(74) *Attorney, Agent, or Firm* — QUALCOMM Incorporated

(57) ABSTRACT

An apparatus includes a receiver and an up-mixer. The receiver is configured to receive a bitstream that includes an encoded mid signal and encoded stereo parameter information. The encoded stereo parameter information represents a first value of a stereo parameter and a second value of the stereo parameter. The first value is associated with a first frequency range. The second value is associated with a second frequency range that is distinct from the first frequency range. The up-mixer is configured to perform an up-mix operation on a frequency-domain decoded mid signal generated from the encoded mid signal. A particular value based on the first value and the second value is applied to the frequency-domain decoded mid signal during the up-mix operation.

20 Claims, 9 Drawing Sheets

Related U.S. Application Data continuation of application No. 16/919,483, filed on Jul. 2, 2020, now Pat. No. 11,102,600, which is a continuation of application No. 16/437,518, filed on Jun. 11, 2019, now Pat. No. 10,757,521, which is a continuation of application No. 15/708,717, filed on Sep. 19, 2017, now Pat. No. 10,362,423.

(60) Provisional application No. 62/407,843, filed on Oct. 13, 2016.

(51) Int. Cl.

| | |
|---|---|
| ***G10L 19/02*** | (2013.01) |
| ***G10L 19/022*** | (2013.01) |
| ***H04S 1/00*** | (2006.01) |

(52) U.S. Cl.

CPC ........ *G10L 19/0204* (2013.01); *G10L 19/022* (2013.01); *H04S 2400/01* (2013.01); *H04S 2420/03* (2013.01); *H04S 2420/07* (2013.01)

(56) References Cited

U.S. PATENT DOCUMENTS

| | | | |
|---|---|---|---|
| 7,983,922 | B2 | 7/2011 | Neusinger et al. |
| 8,340,306 | B2 | 12/2012 | Faller |
| 8,379,868 | B2 | 2/2013 | Goodwin et al. |
| 9,293,143 | B2 | 3/2016 | Villette et al. |
| 10,163,447 | B2 | 12/2018 | Krishnan et al. |
| 10,362,423 | B2 | 7/2019 | Chebiyyam |
| 10,757,521 | B2 | 8/2020 | Chebiyyam |
| 11,102,600 | B2 | 8/2021 | Chebiyyam et al. |
| 2009/0198356 | A1 | 8/2009 | Goodwin et al. |
| 2010/0217607 | A1 | 8/2010 | Neuendorf et al. |
| 2015/0213806 | A1 | 7/2015 | Disch et al. |
| 2015/0213808 | A1 | 7/2015 | Disch et al. |
| 2016/0035361 | A1 | 2/2016 | Ekstrand et al. |
| 2016/0189723 | A1 | 6/2016 | Davis |
| 2018/0109896 | A1 | 4/2018 | Chebiyyam et al. |
| 2019/0297444 | A1 | 9/2019 | Chebiyyam |
| 2021/0385601 | A1 | 12/2021 | Chebiyyam |

FOREIGN PATENT DOCUMENTS

| | | | |
|---|---|---|---|
| CN | 104838442 | A | 8/2015 |
| JP | 2015535958 | A | 12/2015 |
| KR | 20160033776 | A | 3/2016 |
| KR | 20160042890 | A | 4/2016 |
| KR | 20160111042 | A | 9/2016 |
| WO | 2010040522 | A2 | 4/2010 |
| WO | 2011107951 | A1 | 9/2011 |
| WO | 2015088919 | | 6/2015 |
| WO | 2015095008 | A1 | 6/2015 |

OTHER PUBLICATIONS

Herre J., et al., "MPEG-H 3D Audio—The New Standard for Coding of Immersive Spatial Audio", IEEE Journal of Selected Topics in Signal Processing, Aug. 2015, 10 Pages.

International Preliminary Report on Patentability—PCT/US2017/052554 The International Bureau of WIPO—Geneva, Switzerland, Jan. 28, 2019.

International Search Report and Written Opinion—PCT/US2017/052554—ISA/EPO—Nov. 10, 2017.

ISO/IEC DIS 23008-3. Information technology—High Efficiency Coding and Media Delivery in Heterogeneous Environments—Part 3: 3D Audio, ISO/IEC JTC 1/SC 29/WG 11. Oct. 23, 2013, (106 meeting w14060), 137 Pages, Aug. 5, 2014.

Krishnaprasad V.M., "Optimal Delayed Decisions in Encoding and Decoding of Audio Signals and General Sources" Sep. 30, 2010, 147 Pages.

Mauler D., et al., "A Low Delay, Variable Resolution, Perfect Reconstruction Spectral Analysis-Synthesis System for Speech Enhancement", 2007 15th European Signal Processing Conference, IEEE, Sep. 3, 2007 (Sep. 3, 2007), pp. 222-226, (Apr. 30, 2015), XP032773138, ISBN: 978-83-921340-4-6, https://www.eurasip.org/Proceedings/Eusipco/Eusipco2007/Papers/A2L-D02.pdf [retrieved on Apr. 30, 2015], 1, 2.

Taiwan Search Report—TW106132782—TIPO—Aug. 11, 2021.

Engdegard J., et al., "Spatial Audio Object Coding (SAOC)—The Upcoming MPEG Standard on Parametric Object Based Audio Coding", Audio Engineering Society Convention 124, May 17-20, 2008, Amsterdam, NL, Paper 7377, 15 Pages.

PARAMETRIC AUDIO DECODING

I. CROSS REFERENCE TO RELATED APPLICATIONS

This application is a continuation of U.S. Non-Provisional application Ser. No. 17/409,749 now U.S. Pat. No. 11,716, 584, entitled "PARAMETRIC AUDIO DECODING," filed Aug. 23, 2021, which is a continuation of U.S. Non-Provisional application Ser. No. 16/919,483 now U.S. Pat. No. 11,102,600, entitled "PARAMETRIC AUDIO DECODING" filed Jul. 2, 2020, which is a continuation of U.S. patent application Ser. No. 16/437,518, now U.S. Pat. No. 10,757,521 entitled "PARAMETRIC AUDIO DECODING," filed Jun. 11, 2019, which is a continuation of U.S. patent application Ser. No. 15/708,717, now U.S. Pat. No. 10,362,423, entitled "PARAMETRIC AUDIO DECODING," filed Sep. 19, 2017, which claims the benefit of U.S. Provisional Patent Application No. 62/407,843, entitled "PARAMETRIC AUDIO DECODING," filed Oct. 13, 2016, all of which are incorporated by reference in their entireties.

II. FIELD

The present disclosure is generally related to parametric audio decoding.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

A computing device may include multiple microphones to receive audio signals. When stereo audio is recorded, an encoder of the computing device may generate stereo parameters based on the audio signals. The encoder may generate a bitstream encoding the audio signals and the values of the stereo parameter. The computing device may transmit the bitstream to other computing devices.

A second computing device may receive and decode the bitstream to generate output signals based on the bitstream. The decoder may generate the output signals by adjusting decoded audio based on the values of the stereo parameters. In certain circumstances, using the values of the stereo parameters to adjust the decoded audio may not faithfully reproduce the audio signal. For example, the output signal may include sound artifacts that result from applying the values of the stereo parameters to the decoded audio signal.

IV. SUMMARY

According to one implementation of techniques disclosed herein, an apparatus includes a receiver configured to receive a bitstream that includes an encoded mid signal and encoded stereo parameter information. The encoded stereo parameter information represents a first value of a stereo parameter and a second value of the stereo parameter. The first value is associated with a first frequency range, and the first value is determined using an encoder-side windowing scheme. The second value is associated with a second frequency range, and the second value is determined using the encoder-side windowing scheme. The apparatus also includes a mid signal decoder configured to decode the encoded mid signal to generate a decoded mid signal. The apparatus also includes a transform unit configured to perform a transform operation on the decoded mid signal to generate a frequency-domain decoded mid signal using a decoder-side windowing scheme.

The apparatus further includes a stereo decoder configured to decode the encoded stereo parameter information to determine the first value and the second value. The apparatus also includes a stereo parameter conditioner configured to perform a conditioning operation on the first value and the second value to generate a conditioned value of the stereo parameter. The conditioned value is associated with a particular frequency range that is a subset of the first frequency range or a subset of the second frequency range. The apparatus further includes an up-mixer configured to perform an up-mix operation on the frequency-domain decoded mid signal to generate a first frequency-domain output signal and a second frequency-domain output signal. The conditioned value is applied to the frequency-domain decoded mid signal during the up-mix operation. The apparatus also includes an output device configured to output a first output signal and a second output signal. The first output signal is based on the first frequency-domain output signal, and the second output signal is based on the second frequency-domain output signal.

According to another implementation of the techniques disclosed herein, a method includes receiving, at a decoder, a bitstream that includes an encoded mid signal and encoded stereo parameter information. The encoded stereo parameter information represents a first value of a stereo parameter and a second value of the stereo parameter. The first value is associated with a first frequency range, and the first value is determined using an encoder-side windowing scheme. The second value is associated with a second frequency range, and the second value is determined using the encoder-side windowing scheme. The method also includes decoding the encoded mid signal to generate a decoded mid signal. The method further includes performing a transform operation on the decoded mid signal to generate a frequency-domain decoded mid signal using a decoder-side windowing scheme.

The method also includes decoding the encoded stereo parameter information to determine the first value and the second value. The method further includes performing a conditioning operation on the first value and the second value to generate a conditioned value of the stereo parameter. The conditioned value is associated with a particular frequency range that is a subset of the first frequency range or a subset of the second frequency range. The method also includes performing an up-mix operation on the frequency-domain decoded mid signal to generate a first frequency-domain output signal and a second frequency-domain output signal. The conditioned value is applied to the frequency-domain decoded mid signal during the up-mix operation. The method also includes outputting a first output signal and a second output signal. The first output signal is based on the first frequency-domain output signal, and the second output signal is based on the second frequency-domain output signal.

According to another implementation of the techniques disclosed herein, a computer-readable storage device stores instructions that, when executed by a processor within a decoder, cause the processor to perform operations including receiving a bitstream that includes an encoded mid signal and encoded stereo parameter information. The encoded stereo parameter information represents a first value of a stereo parameter and a second value of the stereo parameter. The first value is associated with a first frequency range, and the first value is determined using an encoder-side windowing scheme. The second value is associated with a second frequency range, and the second value is determined using the encoder-side windowing scheme. The operations also include decoding the encoded mid signal to generate a decoded mid signal.

The operations also include performing a transform operation on the decoded mid signal to generate a frequency-domain decoded mid signal using a decoder-side windowing scheme. The operations also include decoding the encoded stereo parameter information to determine the first value and the second value. The operations also include performing a conditioning operation on the first value and the second value to generate a conditioned value of the stereo parameter. The conditioned value is associated with a particular frequency range that is a subset of the first frequency range or a subset of the second frequency range.

The operations also include performing an up-mix operation on the frequency-domain decoded mid signal to generate a first frequency-domain output signal and a second frequency-domain output signal. The conditioned value is applied to the frequency-domain decoded mid signal during the up-mix operation. The operations also include outputting a first output signal and a second output signal. The first output signal is based on the first frequency-domain output signal, and the second output signal is based on the second frequency-domain output signal.

According to another implementation of the techniques disclosed herein, an apparatus includes means for receiving a bitstream that includes an encoded mid signal and encoded stereo parameter information. The encoded stereo parameter information represents a first value of a stereo parameter and a second value of the stereo parameter. The first value is associated with a first frequency range, and the first value is determined using an encoder-side windowing scheme. The second value is associated with a second frequency range, and the second value is determined using the encoder-side windowing scheme. The apparatus also includes means for decoding the encoded mid signal to generate a decoded mid signal.

The apparatus also includes means for performing a transform operation on the decoded mid signal to generate a frequency-domain decoded mid signal using a decoder-side windowing scheme. The apparatus also includes means for decoding the encoded stereo parameter information to determine the first value and the second value. The apparatus also includes means for performing a conditioning operation on the first value and the second value to generate a conditioned value of the stereo parameter. The conditioned value is associated with a particular frequency range that is a subset of the first frequency range or a subset of the second frequency range.

The apparatus also includes means for performing an up-mix operation on the frequency-domain decoded mid signal to generate a first frequency-domain output signal and a second frequency-domain output signal. The conditioned value is applied to the frequency-domain decoded mid signal during the up-mix operation. The apparatus also includes means for outputting a first output signal and a second output signal. The first output signal is based on the first frequency-domain output signal, and the second output signal is based on the second frequency-domain output signal.

V. BRIEF DESCRIPTION OF THE DRAWINGS

VI. DETAILED DESCRIPTION

Figure 1:
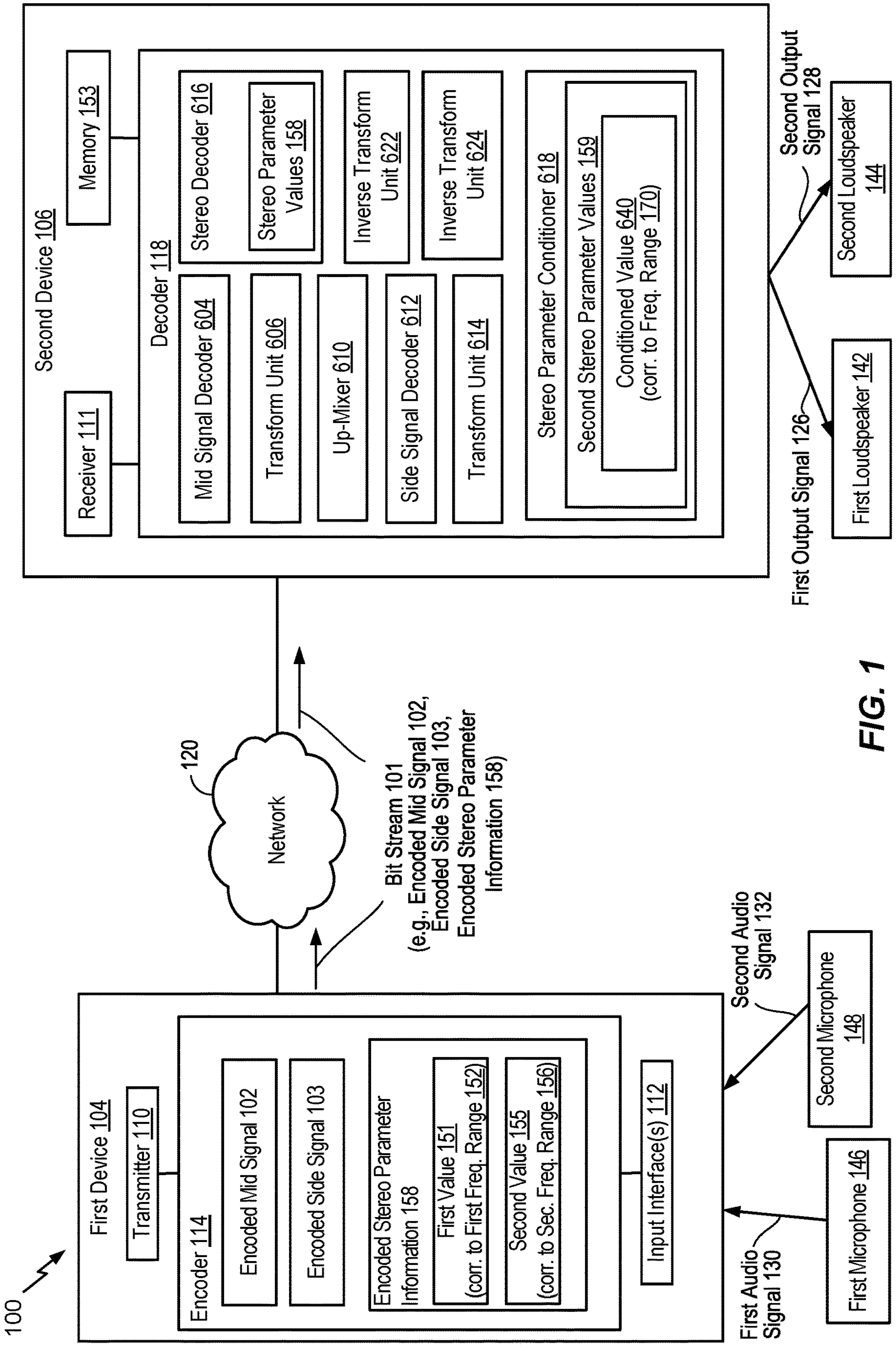
FIG. 1 is a block diagram of a particular illustrative example of a system that includes a device operable to perform parametric audio decoding.

Systems and devices operable to perform parametric audio encoding and decoding are disclosed. In some implementations, encoder/decoder windowing may be mismatched for multichannel signal coding to reduce decoding delay, as described further herein.

A device may include an encoder configured to encode multiple audio signals, a decoder configured to decode multiple audio signals, or both. The multiple audio signals may be captured concurrently in time using multiple recording devices, e.g., multiple microphones. In some examples, the multiple audio signals (or multi-channel audio) may be synthetically (e.g., artificially) generated by multiplexing several audio channels that are recorded at the same time or at different times. As illustrative examples, the concurrent recording or multiplexing of the audio channels may result in a 2-channel configuration (i.e., Stereo: Left and Right), a 5.1 channel configuration (Left, Right, Center, Left Surround, Right Surround, and the low frequency emphasis (LFE) channels), a 7.1 channel configuration, a 7.1+4 channel configuration, a 22.2 channel configuration, or a N-channel configuration.

In some systems, an encoder and a decoder may operate as a pair. The encoder may perform one or more operations to encode an audio signal and the decoder may perform the one or more operations (in a reverse order) to generate a decoded audio output. To illustrate, each of the encoder and the decoder may be configured to perform a transform operation (e.g., a discrete Fourier transform (DFT) operation) and an inverse transform operation (e.g., an inverse discrete Fourier transform (IDFT) operation). For example, the encoder may transform an audio signal from a time domain to a transform domain to estimate values of one or more parameters (e.g., Inter Channel stereo parameters) in the transform domain frequency bands, such as DFT bands. The encoder may also waveform code one or more audio signals based on the estimated one or more parameters. As another example, the decoder may transform a received audio signal from a time domain to a transform domain prior to application of one or more received parameters to the received audio signal.

Prior to each transform operation and subsequent to each inverse transform operation, a signal (e.g., an audio signal) is "windowed" to generate windowed samples. The windowed samples are used to perform the transform operation and the windowed samples are overlap added after the inverse transform operation. As used herein, applying a window to a signal or windowing a signal includes scaling a portion of the signal to generate a time-range of samples of the signal. Scaling the portion may include multiplying the portion of the signal by values that correspond to a shape of a window.

In some implementations, the encoder and the decoder may implement different windowing schemes. For example, the encoder may apply a first window having a first set of characteristics (e.g., a first set of parameters), and the decoder may apply a second window having a second set of characteristics (e.g., a second set of parameters). One or more characteristics of the first set of characteristics may be different from the second set of characteristics. For example, the first set of characteristics may differ from the second set of characteristics in terms of a window's overlapping portion size or a window overlapping portion shape. To illustrate, when the first window and the second window are mismatched (e.g., a look ahead portion of the second window of a decoder is shorter than a look ahead portion of the first window of an encoder), a delay may be reduced as compared to a system where the encoder and the decoder processing and overlap-add windows match closely and are applied on samples corresponding to the same time-range of samples.

When the window used by the encoder and the window used by the decoder are mismatched, using values of stereo parameters provided by the encoder may result in lower audio quality at the decoder. For example, a variation of a first value of a stereo parameter corresponding to a first frequency range to a second value of the stereo parameter corresponding to a second frequency range may result in audible artifacts when the processing and overlap-add window at the encoder is different (e.g., has a different size) than the one used at the decoder.

The encoder may divide a frequency range into multiple frequency bins. A group of frequency bins may be treated as a single frequency band (or range). For example, the first frequency range (e.g., a first frequency band) may include a set of frequency bins. The encoder may determine the values of the stereo parameters at a first resolution. For example, the encoder may determine a value of the stereo parameter per frequency band (or range). The decoder may apply the values of the stereo parameters at a second resolution that is coarser (or more fine-grained) than the first resolution. For example, the decoder may apply the first value (e.g., a first band value) of the stereo parameter corresponding to the first frequency range to each frequency bin of the set of frequency bins. Shorter bands (with fewer frequency bins), particularly at lower frequencies (e.g., less than 1 kHz), with significant variation in the value of the stereo parameter from band to band may lead to artifacts. For example, application of the values of the stereo parameter during stereo upmixing may introduce spectral leakage artifacts between frequency bins due to poor passband-stopband rejection ratio corresponding to shorter overlap windows.

The decoder may generate second values of the stereo parameter by performing a conditioning operation on the first values (e.g., band values) to decrease artifacts. As used herein, a "conditioning operation" may include a limiting operation, a smoothing operation, an adjustment operation, an interpolation operation, an extrapolation operation, setting different values of the stereo parameter to a constant value across bands, setting different values of the stereo parameter to a constant value across frames, setting different values of the stereo parameter to zero (or a relatively small value), or a combination thereof. The decoder may change a value of the stereo parameter applied to at least one bin from a band value to a bin value between the band value and an adjacent band value. To illustrate, the decoder may determine that the bitstream indicates a first band value (e.g., −10 decibels (dB)) of a stereo parameter corresponding to a first frequency range (e.g., 200 hertz (Hz) to 400 Hz). The decoder may determine that the bitstream indicates a second band value (e.g., 5 dB) of the stereo parameter corresponding to a second frequency range (e.g., 400 Hz to 600 Hz). The first frequency range may include a first frequency bin (e.g., 200 Hz to 300 Hz) and a second frequency bin (e.g., 300 Hz to 400 Hz). The decoder may change (or condition) a value applied to the second frequency bin from the first band value (e.g., −10 dB) to a modified first bin value (e.g., −5 dB) based on the first band value and the second band value (e.g., 5 dB). For example, the decoder may determine the first bin value by applying an estimation function to the first band value and the second band value. In another example, the decoder may condition the values of the stereo parameter corresponding to select frequency bins within the first band, the second band, or both, based on a degree of parameter variation from the first frequency range to the second frequency range. For example, the decoder may condition the values of the stereo parameter corresponding to particular frequency bins of the first band, particular frequency bins of the second band, or both, based on a difference between the first band value and the second band value. In another implementation, the decoder may also condition the value of the stereo parameter based on the particular frequency bin value in the first band and particular frequency bin value in the second band of the previous frame.

Similarly, the second frequency range (e.g., 400 Hz to 600 Hz) may include a first particular frequency bin (e.g., 400 Hz to 500 Hz) and a second particular frequency bin (e.g., 500 Hz to 600 Hz). The decoder may change (or condition) a value applied to the first particular frequency bin from the second band value (e.g., 5 dB) to a second bin value (e.g., 0 dB) based on the first band value (e.g., −10 dB) and the second band value.

The decoder may generate a first output signal and a second output signal based at least in part on the second values of the stereo parameters. Differences between the second values corresponding to successive frequency ranges may be lower (as compared to the first values) and thus less perceptible. For example, a difference between the first bin value (e.g., −5 dB) and the second bin value (e.g., 0 dB) may be less perceptible at a boundary (e.g., 400 Hz) of the first frequency range and the second frequency range, as compared to a difference from the first band value (e.g., −10 dB) to the second band value (e.g., 5 dB). The decoder may provide the first output signal to a first speaker and the second output signal to a second speaker.

As referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device.

Referring to FIG. 1, a particular illustrative example of a system is disclosed and generally designated 100. The system 100 includes a first device 104 communicatively coupled, via a network 120, to a second device 106. The network 120 may include one or more wireless networks, one or more wired networks, or a combination thereof.

The first device 104 includes an encoder 114, a transmitter 110, one or more input interfaces 112, or a combination thereof. A first input interface of the input interface(s) 112 is coupled to a first microphone 146. A second input interface of the input interface(s) 112 is coupled to a second microphone 148. The encoder 114 is configured to down mix and encode multiple audio signals and stereo parameter values, as described herein.

During operation, the first device 104 may receive a first audio signal 130 via the first input interface from the first microphone 146 and may receive a second audio signal 132 via the second input interface from the second microphone 148. The first audio signal 130 may correspond to one of a right channel signal or a left channel signal. The second audio signal 132 may correspond to the other of the right channel signal or the left channel signal.

The encoder 114 may apply a first window (based on first window parameters) to at least a portion of an audio signal to generate windowed samples. The windowed samples may be generated in a time-domain. The encoder 114 (e.g., a frequency-domain stereo coder) may transform one or more time-domain signals, such as the windowed samples (e.g., the first audio signal 130 and the second audio signal 132), into frequency-domain signals. The frequency-domain signals may be used to estimate values of stereo parameters. For example, the encoder 114 may estimate stereo parameter values 151, 155 of a stereo parameter and encode the stereo parameter values 151, 155 as encoded stereo parameter information 158. The stereo parameter may enable rendering of spatial properties associated with left channels and right channels. Although estimation of stereo parameter values 151, 155 corresponding to one stereo parameter is described, it should be understood that the encoder 114 may determine stereo parameter values corresponding to multiple stereo parameters. For example, the encoder 114 may determine first stereo parameter values corresponding to a first stereo parameter, second stereo parameter values corresponding to a second stereo parameter, and so on. According to some implementations, a stereo parameter includes interchannel intensity difference (IID) parameters, interchannel level differences (ILDs) parameters, interchannel time difference (ITD) parameters, interchannel phase difference (IPD) parameters, interchannel correlation (ICC) parameters, non-causal shift parameters, spectral tilt parameters, inter-channel voicing parameters, inter-channel pitch parameters, inter-channel gain parameters, etc., as illustrative, non-limiting examples.

The stereo parameter values 151, 155 include a first parameter value 151 corresponding to a first frequency range 152 (e.g., 200 Hz to 400 Hz) and a second parameter value 155 corresponding to a second frequency range 156 (e.g., 400 Hz to 800 Hz). In a particular aspect, the first frequency range 152 may correspond to a frequency band that includes a plurality of frequency bins. Each frequency bin may correspond to a particular resolution or length (e.g., 50 Hz or 40 Hz) of a frequency range. In a particular aspect, a frequency range may include non-uniform sized frequency bins. For example, a first frequency bin of a frequency range may have a first length that is distinct from a second length of a second frequency bin of the frequency range. A length (e.g., 200 Hz) of a frequency range (e.g., 400 Hz to 600 Hz) may correspond to a difference between a highest frequency value and a lowest frequency value in the frequency range (e.g., 600 Hz-400 Hz). A length of a frequency bin may be less than or equal to a size of a frequency range that includes the frequency bin. The frequency bin and frequency range structure may be based on human auditory psychoacoustics, such that each frequency bin and frequency range corresponds to varying frequency resolutions. Typically, the lower frequency bands result in higher resolutions than the higher frequency bands.

In a particular aspect, the encoder 114 may determine a parameter value (e.g., an IPD value, an ILD value, or a gain value) corresponding to each of the frequency bins of the first frequency range 152. To illustrate, the encoder 114 may determine the first parameter value 151 based on the parameter values of the one or more frequency bins of the first frequency range 152. For example, the first parameter value 151 may correspond to a weighted average of the parameter values of the one or more frequency bins. The encoder 114 may similarly determine the second parameter value 155 based on parameter values of one or more frequency bins of the second frequency range 156. The first frequency range 152 may have the same size or a different size than the second frequency range 156. For example, the first frequency range 152 may include a first number of frequency bins and the second frequency range 156 may include a second number of frequency bins that is the same as, or distinct from, the first number.

The encoder 114 encodes a mid signal to generate an encoded mid signal 102. The encoder 114 encodes a side signal to generate an encoded side signal 103. For purposes of illustration, unless otherwise noted, it is assumed that that the first audio signal 130 is a left-channel signal (l or L) and the second audio signal 132 is a right-channel signal (r or R). The frequency-domain representation of the first audio signal 130 may be noted as $L_{fr}(b)$ and the frequency-domain representation of the second audio signal 132 may be noted as $R_{fr}(b)$, where b represents a band of the frequency-domain representations. According to one implementation, the side signal (e.g., a side-band signal $S_{fr}(b)$) may be generated in the frequency-domain from frequency-domain representations of the first audio signal 130 and the second audio signal 132. For example, the side signal 103 (e.g., the side-band signal $S_{fr}(b)$) may be expressed as $(L_{fr}(b)-R_{fr}(b))/2$. The side signal (e.g., the side-band signal $S_{fr}(b)$) may be provided to a side-band encoder to generate the side-band bitstream. According to one implementation, the mid signal (e.g., a mid-band signal m(t)) may be generated in the time-domain and transformed into the frequency-domain. For example, the mid signal (e.g., a mid-band signal m(t)) may be expressed as $(l(t)+r(t)/2$. The time-domain/frequency-domain mid-band signals (e.g., the mid signal) may be provided to a mid-band encoder to generate the encoded mid signal 102.

The side-band signal $S_{fr}(b)$ and the mid-band signal m(t) or $M_{fr}(b)$ may be encoded using multiple techniques. According to one implementation, the time-domain mid-band signal m(t) may be encoded using a time-domain technique, such as algebraic code-excited linear prediction (ACELP), with a bandwidth extension for higher band coding. Before side-band coding, the mid-band signal m(t) (either coded or uncoded) may be converted into the frequency-domain (e.g., the transform-domain) to generate the mid-band signal $M_{fr}(b)$. A bitstream 101 includes the encoded mid signal 102, the encoded side signal 103, and the encoded stereo parameter information 158. The transmitter 110 transmits the bitstream 101, via the network 120, to the second device 106.

The second device 106 includes a decoder 118 coupled to a receiver 111 and to a memory 153. The decoder 118 includes a mid signal decoder 604, a transform unit 606, an up-mixer 610, a side signal decoder 612, a transform unit 614, a stereo decoder 616, a stereo parameter conditioner 618, an inverse transform unit 622, and an inverse transform unit 624. The decoder 118 is configured to up-mix and render the multiple channels based on at least one conditioned parameter value. The second device 106 may be coupled to a first loudspeaker 142, a second loudspeaker 144, or both. The second device 106 may also include a memory 153 configured to store analysis data.

The receiver 111 of the second device 106 may receive the bitstream 101. The mid signal decoder is configured to decode the encoded mid signal 102 to generate a decoded mid signal, such as a decoded mid signal 630 (e.g., a mid-band signal ($m_{CODED}(t)$)) of FIG. 6. The transform unit 606 is configured to perform a transform operation on the decoded mid signal to generate a frequency-domain decoded mid signal, such as a frequency-domain decoded mid signal ($M_{CODED}(b)$) 632 of FIG. 6. The transform unit 606 may apply second windows (e.g., analysis window based on second window parameters) to the decoded mid signal to generate windowed samples. The windowed samples may be generated in a time-domain. The side signal decoder 612 is configured to decode the encoded side signal 103 to generate a decoded side signal, such as a decoded side signal 634 of FIG. 6. The transform unit 614 is configured to perform a transform operation on the decoded side signal to generate a frequency-domain decoded side signal, such as a frequency-domain decoded side signal 636 of FIG. 6. The transform unit 614 may apply second windows (e.g., analysis window based on second window parameters) to the decoded side signal to generate windowed samples. The windowed samples may be generated in a time-domain.

The stereo parameter decoder 616 is configured to decode the encoded stereo parameter information 158 to determine the first value 151 of the stereo parameter, the second value 155 of the stereo parameter, and additional stereo parameter values 158. The first value 151 is associated with the first frequency range 152, and the first value 151 is determined using the encoder-side windowing scheme of the encoder 114 that uses first windows having a first overlap size. The second value 155 is associated with the second frequency range 156, and the second value 155 is determined also using the encoder-side windowing scheme. Additionally, the stereo decoder 638 may determine additional stereo parameter values for each stereo parameter encoded into the bitstream 101 in response to decoding the encoded stereo parameter information 158.

The stereo parameter conditioner 618 is configured to perform a conditioning operation on the first value 151 and the second value 155 to generate a conditioned value 640 of the stereo parameter. The conditioned value 640 may be associated with the particular frequency range 170 that is a subset of the first frequency range 152 or a subset of the second frequency range 156. As a non-limiting example, the stereo parameter conditioner 618 may apply an estimation function to the first value 151 and the second value 155. The estimation function may include an averaging function, an adjustment function, or a curve-fitting function. In other implementations, the stereo parameter conditioner 618 may be configured to perform other conditioning operations on the values 151, 155 to generate the conditioned value 640. For example, the stereo parameter conditioner 618 may perform a limiting operation, a smoothing operation, an adjustment operation, an interpolation operation, an extrapolation operation, an operation that includes setting the values 151, 155 to a constant value across bands, an operation that includes setting the values 151, 155 to a constant value across frames, an operation that includes setting the values 151, 155 to zero (or a relatively small value), or a combination thereof. If the particular frequency range 170 is a subset of the first frequency range 152, the conditioned value 640 is distinct from the first value 151. If the particular frequency range 170 is a subset of the second frequency range 156, the conditioned value 640 is distinct from the second value 155. The stereo parameter conditioner 618 may also be configured to generate one or more additional conditional values (not shown) of the stereo parameter based on the conditioning operation. Each conditional value of the one or more additional conditional values is associated with a corresponding frequency range that is a subset of the first frequent range 152 or a subset of the second frequency range 156.

The stereo parameter conditioner 618 may determine whether an estimation function is to be applied based on an overlap window size, a coding bitrate, variation of values of one or more stereo parameters, or a combination thereof. For example, the bitstream 101 may indicate stereo parameter values of one or more stereo parameters. The stereo parameter conditioner 618 may determine that an estimation function is to be applied to stereo parameter values of a subset of the one or more stereo parameters in response to determining that the overlap window size fails to satisfy (e.g., is less than) a threshold window size, that a coding bitrate satisfies (e.g., is greater than or equal to) a threshold coding bitrate, that variation of values of a stereo parameter satisfies a variation threshold, or a combination thereof. In a particular aspect, the stereo parameter conditioner 618 may determine one or more thresholds associated with the estimation function based on various parameters. The one or more thresholds may include the threshold window size, the threshold coding bitrate, the variation threshold, or a combination thereof. The various parameters may include, the coding bitrate, DFT window characteristics, the stereo parameter values, underlying mid signal characteristics, or a combination thereof.

In a particular aspect, the estimation function applied to the stereo parameter values 158 of a first stereo parameter may be based on second stereo parameter values of a second stereo parameter. For example, the bitstream 101 may include the stereo parameter values 158 of a first stereo parameter (e.g., ILD), particular parameter values of a second stereo parameter (e.g., IPD), or a combination thereof. The stereo parameter conditioner 618 may determine whether the estimation function is to be applied to the stereo parameter values 158 based on the stereo parameter values 158, the particular parameter values of the second stereo parameter, or a combination thereof. For example, the stereo parameter conditioner 618 may determine first variation of the stereo parameter values 158, second variation of the particular parameter values, or both. The stereo parameter conditioner 618 may, in response to determining that the first variation satisfies (e.g., is greater than) a first variation threshold (e.g., a medium variation threshold) and that the second variation satisfies (e.g., is greater than) a variation threshold (e.g., a medium variation threshold), determine that the estimation function is to be applied on the stereo parameter values 158, the particular parameter values, or a combination thereof. In a particular implementation, the stereo parameter conditioner 618 may, in response to determining that the first variation satisfies (e.g., is less than) a first variation threshold (e.g., a very low variation threshold) and that the second variation satisfies (e.g., is greater than) a second variation threshold (e.g., a medium variation threshold), determine that the estimation function is not to be applied to the stereo parameter values 158 of the first stereo parameter (e.g., ILD), the particular parameter values of the second stereo parameter (e.g., IPD), or a combination thereof. The decoder 118 may adaptively set the first variation threshold, the second variation threshold, or both, to reduce (e.g., minimize) artifacts.

The stereo parameter conditioner 618 may generate second stereo parameter values 159 based on the stereo parameter values 158, as further described with reference to FIGS. 2-5. For example, the stereo parameter conditioner 618 may generate the second stereo parameter values 159 including one or more conditioned values (e.g., conditioned parameter values) by applying an estimation function (e.g., an averaging function, an adjustment function, a curve-fitting function) to one or more of the stereo parameter values 158. The stereo parameter values 158 may include the first parameter value 151 corresponding to the first frequency range 152 (e.g., 200 Hz to 400 Hz), the second parameter value 155 corresponding to the second frequency range 156 (e.g., 400 Hz to 600 Hz), or both.

The stereo parameter conditioner 618 may determine the one or more conditioned parameter values corresponding to a set of frequency ranges. The set of frequency ranges may include one or more subsets of the first frequency range 152, one or more subsets of the second frequency range 156, or a combination thereof. For example, the stereo parameter conditioner 618 may determine a conditioned parameter value 640 of the conditioned parameter values 640 based on at least the first parameter value 151 and the second parameter value 155. The first parameter value 151 and the second parameter value 155 may correspond to the current frame (or sub-frame) or values from the previous frame (or sub-frame). The conditioned parameter value 640 may correspond to a frequency range 170 that is a subset (e.g., a sub-range) of at least the first frequency range 152 or the second frequency range 156. For example, a portion of the frequency range 170 may correspond to a subset of the first frequency range 152 and a remaining portion of the frequency range 170 may correspond to a subset of the second frequency range 156.

The set of frequency ranges may include the frequency range 170 corresponding to the conditioned parameter value 640. As referred to herein, a "conditioned parameter value" refers to a parameter value used by or determined by a decoder for a particular frequency range that is different than a parameter value corresponding to the particular frequency range as indicated in the bitstream 101.

The stereo parameter conditioner 618 may use the estimation function to adjust the stereo parameter values 158 locally or overall to generate the second stereo parameter values 159. For example, the stereo parameter conditioner 618 may adjust the stereo parameter values 158 locally by determining the conditioned parameter value 640 of the frequency range 170 that is a subset (e.g., a frequency sub-range or a frequency bin) of the first frequency range 152 (e.g., a frequency band) based on modifying the first parameter value 151 of the first frequency range 152 and a parameter value of an adjacent frequency range. Thus, local modification may adjust (e.g., smooth) parameter values over two frequency ranges that are directly adjacent to each other, such as a first band of frequencies from 200 Hz to 400 Hz and a second band of frequencies from 400 Hz to 600 Hz. In this example, the conditioned parameter value 640 of the frequency range 170 (e.g., the frequency sub-range or the frequency bin) may be independent of parameter values of one or more other (e.g., non-adjacent) frequency ranges. To illustrate, at least one value of the stereo parameter values 158 may correspond to one or more frequency ranges that are non-adjacent to the first frequency range 152. The conditioned parameter value 640 may be independent of the at least one value. As referred to herein, a "non-adjacent frequency range" of a frequency sub-range is a frequency range that is not directly adjacent to a particular frequency range that includes the frequency sub-range.

In a particular implementation, a portion of the frequency range 170 may be a subset of the first frequency range 152 and another portion of the frequency range 170 may be a subset of the second frequency range 156. For example, a first portion of the frequency range 170 may correspond to a first subset of the first frequency range 152 and a remaining portion of the frequency range 170 may correspond to a second subset of the second frequency range 156. The stereo parameter conditioner 618 may adjust the stereo parameter values 158 locally by determining the conditioned parameter value 640 of the frequency range 170 based on one or more parameter values (e.g., the first parameter value 151) of the first frequency range 152 and one or more parameter values (e.g., the second parameter value 155) of the second frequency range 156. The conditioned parameter value 640 may be independent of parameter values corresponding to frequency ranges other than the first frequency range 152 and the second frequency range 156.

In a particular aspect, the stereo parameter conditioner 618 may adjust the stereo parameter values 158 overall by curve fitting some or all of the stereo parameter values 158. The conditioned parameter value 640 of the frequency range 170 (e.g., the frequency sub-range or the frequency bin) may be dependent on parameter values of one or more non-adjacent frequency ranges, parameter values of an adjacent frequency range that is lower than the frequency range 170, or a combination thereof.

In a particular aspect, the stereo parameter conditioner 618 may adjust the stereo parameter values 158 by setting them to a particular (e.g., fixed, constant, or predetermined) value across the frequency bands. For example, the stereo parameter conditioner 618 may generate the second stereo parameter values 159 having the same value (e.g., the particular value) for each frequency bin of the first frequency range 152 and each frequency bin of the second frequency range 156. The particular value may be based on the stereo parameter values 158, underlying signal characteristics such as energy, tilt, spectral variation, overlap window length, or a combination thereof.

In a particular aspect, the stereo parameter conditioner 618 may generate the second stereo parameter values 159 by adjusting the stereo parameter values 158 based on underlying signal characteristics (e.g., mid-band energy, power, tilt, etc.). In some circumstances, the stereo parameter conditioner 618 may use the underlying signal characteristics to determine whether to adjust the stereo parameter values 158 (or a subset of the stereo parameter values 158). For example, the stereo parameter conditioner 618 may, in response to determining that one or more underlying signal characteristics (e.g., mid-band energy, power, tilt, or a combination thereof) satisfy (e.g., is greater than, is less than, or is equal to) a threshold at approximately a boundary (e.g., 400 Hz) of the first frequency range 152 (e.g., 200 Hz to 400 Hz) and the second frequency range 156 (e.g., 400 Hz to 600 Hz), refrain from adjusting the stereo parameter values 158 corresponding to a first subset of the first frequency range and a second subset of the second frequency range. In this example, the first subset of the first frequency range and the second subset of the second frequency range may be proximate to the boundary. When the mid signal energy satisfies the energy threshold, the mid signal energy may reduce the perceptibility of the difference at the boundary between the first parameter value 151 corresponding to the first frequency range 152 and the second parameter value 155 corresponding to the second frequency range 156. In this example, the stereo parameter values 159 may indicate a non-adjusted parameter value corresponding to a frequency range. For example, the second stereo parameter values 159 may indicate that the first parameter value 151 (e.g., a non-adjusted parameter value) corresponds to the first subset of the first frequency range 152, that the second parameter value 155 corresponds to the second subset of the second frequency range 156, or both.

Figure 6:
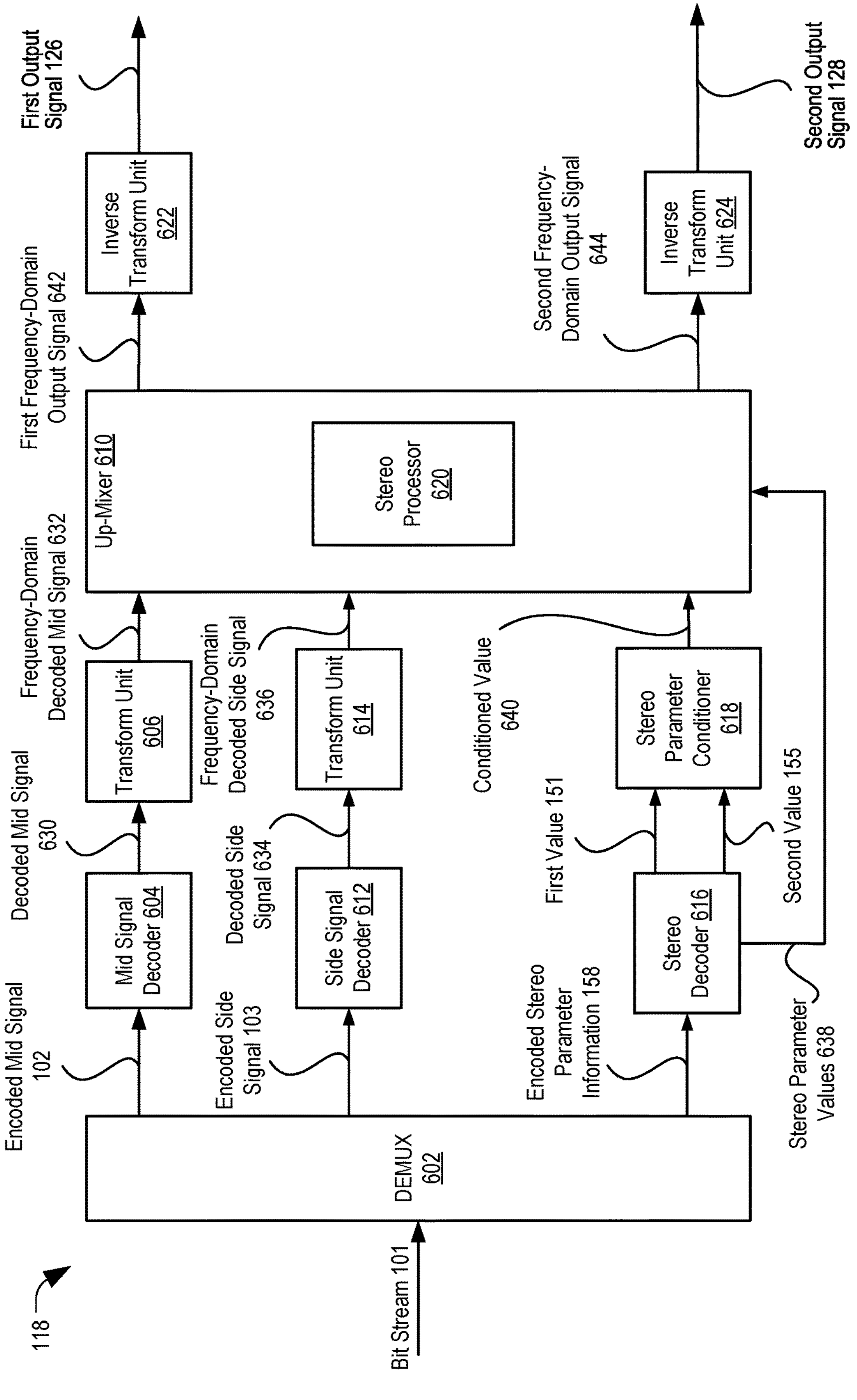
FIG. 6 is a diagram illustrating an example of a decoder of the system of FIG. 1.

According to one implementation, the stereo parameter conditioner 618 may determine whether a variation in a particular stereo parameter satisfies (e.g., exceeds) a threshold. If the variation in the particular stereo parameter satisfies the threshold, the stereo parameter conditioner 618 adjusts a different stereo parameter. As a non-limiting example, the stereo parameter conditioner 618 may determine whether a variation in values of ITDs (e.g., a first stereo parameter) satisfy a threshold. If the stereo parameter conditioner 618 determines that the variation in the values of the ITDs satisfy the threshold, the stereo parameter conditioner 618 adjusts (e.g., conditions) values associated with IPDs (e.g., a second stereo parameter). The up-mixer 610 is configured to perform an up-mix operation on the frequency-domain decoded mid signal (and optionally the frequency-domain decoded side signal) to generate a first frequency-domain output signal (e.g., a first frequency-domain output signal 642 as illustrated in FIG. 6) and a second frequency-domain output signal (e.g., a second frequency-domain output signal 644 as illustrated in FIG. 6). During the up-mix operation, the up-mixer 610 may apply the stereo parameter values 158 to the frequency-domain decoded mid signal (and optionally the frequency-domain decoded side signal). Additionally, during the up-mix operation, the stereo processor 630 may apply the second stereo parameter values (including the conditioned value 640) to the frequency-domain decoded mid signal (and optionally the frequency-domain decoded side signal). The conditioned value 640 may be applied using a decoder-side windowing scheme that uses second windows having a second overlap size that is smaller than the first overlap size. The second overlap size associated with the decoder-side windowing scheme is different than the first overlap size associated with the encoder-side windowing scheme. For example, the second overlap size is smaller than the first overlap size. Additionally, first zero-padding operations may be performed at the encoder 114 in conjunction with the encoder-side windowing scheme, and second zero-padding operations (different from the first zero-padding operations) may be performed at the decoder 118 in conjunction with the decoder-side windowing scheme.

The inverse transform unit 622 is configured to perform an inverse transform operation on the first frequency-domain output signal to generate the first output signal 126. The second inverse transform unit 624 is configured to perform an inverse transform operation on the second frequency-domain output signal to generate the second output signal 128. The second device 106 may output the first output signal 126 via the first loudspeaker 142. The second device 106 may output the second output signal 128 via the second loudspeaker 144. In alternative examples, the first output signal 126 and second output signal 128 may be transmitted as a stereo signal pair to a single output loudspeaker.

Although the first device 104 and the second device 106 have been described as separate devices, in other implementations, the first device 104 may include one or more components described with reference to the second device 106. Additionally or alternatively, the second device 106 may include one or more components described with reference to the first device 104. For example, a single device may include the encoder 114, the decoder 118, the transmitter 110, the receiver 111, the one or more input interfaces 112, the memory 153, or a combination thereof. The memory 153 stores analysis data. The analysis data may include the stereo parameter values 158, the second stereo parameter values 159, the first window parameters that define a first window to be applied by the encoder 114, the second window parameters that define a second window to be applied by the decoder 118, or a combination thereof.

The system 100 may enable the decoder 118 to generate the second stereo parameter values 159 based on the stereo parameter values 158 that are indicated in the received bitstream 101. The second stereo parameter values 159 may include one or more conditioned parameter values. At least some of the second stereo parameter values 159 corresponding to consecutive frequency ranges may have lower or equal variance between them, as compared to values of the stereo parameter values 158 corresponding to the same frequency ranges. Smaller changes in values (or smaller variance) of the second stereo parameter values 159 corresponding to consecutive frequency ranges may result in output signals (e.g., the first output signal 126 and the second output signal 128) that have fewer perceptible artifacts, thereby improving audio quality of the output signals.

Figure 2:
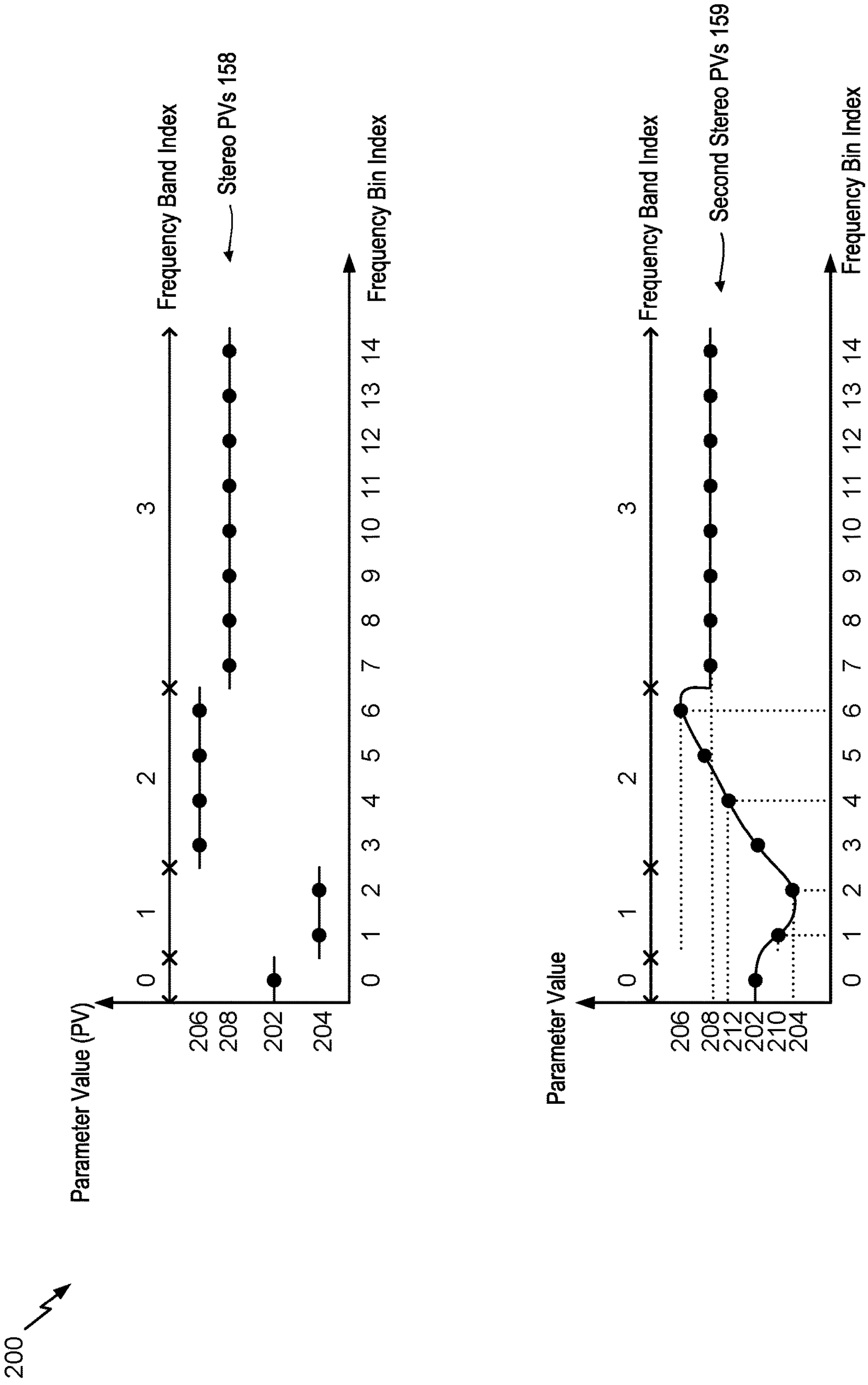
FIG. 2 is a diagram illustrating an example of parameter values generated by the system of FIG. 1.
Figure 3:
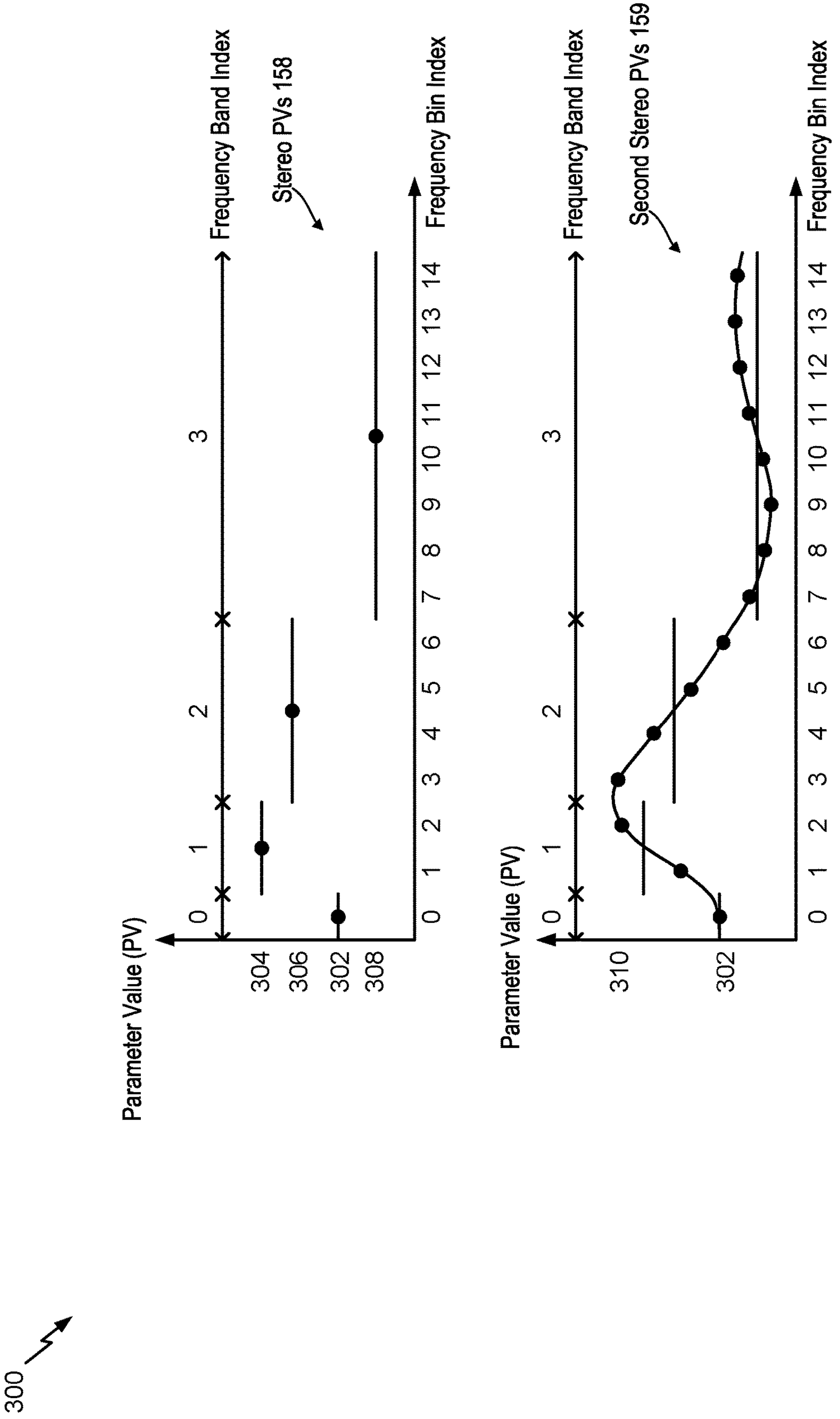
FIG. 3 is a diagram illustrating another example of parameter values generated by the system of FIG. 1.
Figure 4:
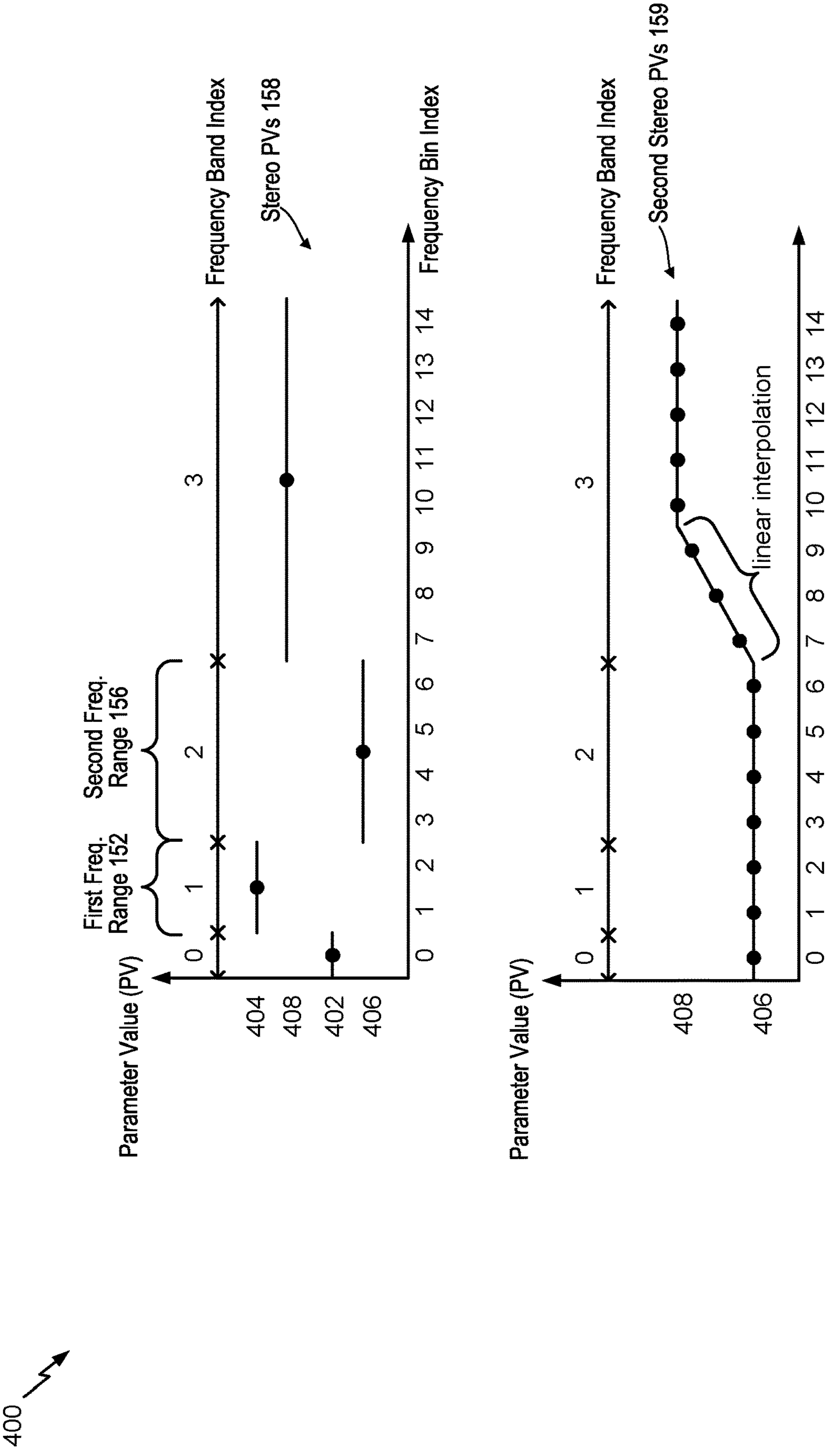
FIG. 4 is a diagram illustrating another example of parameter values generated by the system of FIG. 1.
Figure 5:
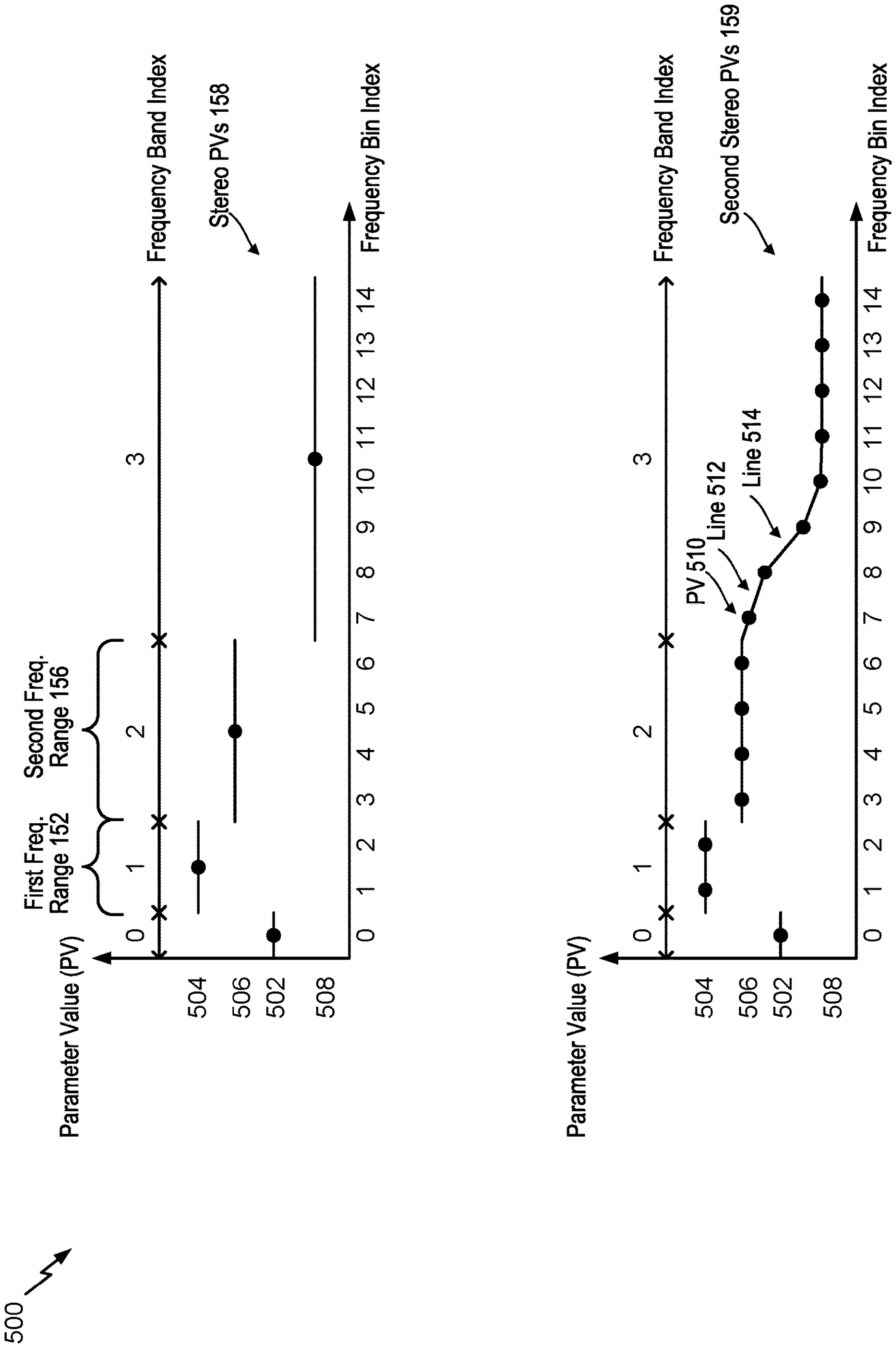
FIG. 5 is a diagram illustrating another example of parameter values generated by the system of FIG. 1.

FIGS. 2-5 illustrate various non-limiting examples of the second stereo parameter values 159 generated by applying an estimation function to the parameter values 158. FIG. 2 illustrates an example of the second stereo parameter values 159 generated by applying an adjustment function to the stereo parameter values 158. FIG. 3 illustrates an example of the second stereo parameter values 159 generated by applying a curve fitting function to the stereo parameter values 158. FIG. 4 illustrates an example of the second stereo parameter values 159 generated by applying a linear adjustment function to the stereo parameter values 158. FIG. 5 illustrates an example of the second stereo parameter values 159 generated by applying a piecewise linear adjustment function to the stereo parameter values 158.

Referring to FIG. 2, an example of the stereo parameter values 158 and an example of the second stereo parameter values 159 is illustrated. The stereo parameter values 158 include a parameter value 202 corresponding to a frequency band 0, a parameter value 204 corresponding to a frequency band 1, a parameter value 206 corresponding to a frequency band 2, and a parameter value 208 corresponding to a frequency band 3. One of the frequency bands 0-2 may correspond to the first frequency range 152 and an adjacent frequency band may correspond to the second frequency range 156. The frequency band 0 may correspond to a frequency band having a frequency band index of 0. Consecutive frequency bands may have consecutive frequency band indices.

Each of the frequency bands 0-3 may include one or more frequency bins. For example, the frequency band 0 includes a single frequency bin (e.g., a frequency bin 0), the frequency band 1 includes a frequency bin 1 and a frequency bin 2, the frequency band 2 includes frequency bins 3-6, and the frequency band 3 includes frequency bins 7-14. The frequency bin 0 may correspond to a frequency bin having a frequency bin index of 0. Consecutive frequency bins may have consecutive frequency bin indices.

The stereo parameter conditioner 618 of FIG. 1 may generate the second stereo parameter values 159 by modifying at least some of the stereo parameter values 158 corresponding to inter-band transitions. For example, the stereo parameter conditioner 618 may perform linear adjustment, piece-wise linear adjustment, or non-linear adjustment.

The stereo parameter conditioner 618 may determine whether to perform adjustment for one or more frequency band boundaries corresponding to the stereo parameter values 158. For example, the stereo parameter conditioner 618 may determine that an adjustment is to be performed for the boundary between the frequency band 0 and the frequency band 1 and that an adjustment is to be performed for the boundary between the frequency band 1 and the frequency band 2. The stereo parameter conditioner 618 may determine that an adjustment is not to be performed for the boundary between the frequency band 2 and the frequency band 3. In a particular aspect, the stereo parameter conditioner 618 determines that an adjustment is to be performed for a boundary between the first frequency range 152 and the second frequency range 156 in response to determining that a difference between the parameter value 204 and the parameter value 206 satisfies a parameter value difference threshold.

The stereo parameter conditioner 618 may, in response to determining that adjustment is to be performed for the boundary between the frequency band 0 and the frequency band 1, determine a parameter value 210 (e.g., a conditioned parameter value) corresponding to the frequency bin 1 between the parameter value 202 of the frequency band 0 and the parameter value 204 of the frequency band 1. The second stereo parameter values 159 may include the parameter value 202 corresponding to the frequency bin 0, the parameter value 210 corresponding to the frequency bin 1, and the parameter value 204 corresponding to the frequency bin 2. A difference between the parameter value 202 and the parameter value 210 is lower than a difference between the parameter value 202 and the parameter value 204, thereby resulting in fewer artifacts at the boundary of the frequency band 0 and the frequency band 1 in the output signals generated by the decoder 118 of FIG. 1.

The stereo parameter conditioner 618 may, in response to determining that adjustment is to be performed for the boundary between the frequency band 1 and the frequency band 2, determine one or more conditioned parameter values between the parameter value 204 corresponding to the frequency bin 2 and the parameter value 206 corresponding to the frequency band 2. The one or more conditioned parameter values may correspond to the frequency bins 3-5. For example, the one or more conditioned parameter values may include a parameter value 212 (e.g., a conditioned parameter value) corresponding to the frequency bin 4. The stereo parameter conditioner 618 may determine that the parameter value 206 corresponds to the frequency bin 6.

The stereo parameter conditioner 618 may, in response to determining that adjustment is not to be performed for the boundary between the frequency band 2 and the frequency band 3, update the second stereo parameter values 159 to include the parameter value 206 corresponding to each frequency bin of the frequency band 3.

The stereo parameter conditioner 618 may thus adjust two or more parameter values of the stereo parameter values 158 to generate the second stereo parameter values 159. Adjusting parameter values across some frequency band boundaries may reduce artifacts in the output signals generated by the decoder 118 of FIG. 1.

Referring to FIG. 3, an example of the stereo parameter values 158 and an example of the second stereo parameter values 159 is illustrated. The stereo parameter values 158 include a parameter value 302 corresponding to the frequency band 0, a parameter value 304 corresponding to the frequency band 1, a parameter value 306 corresponding to the frequency band 2, and a parameter value 308 corresponding to the frequency band 3.

The stereo parameter conditioner 618 of FIG. 1 may generate the second stereo parameter values 159 by curve-fitting at least some of the stereo parameter values 158. For example, the stereo parameter conditioner 618 may perform non-local adjustment of the stereo parameter values 158 to generate the second stereo parameter values 159. To illustrate, a parameter value of the second stereo parameter values 159 corresponding to a frequency bin may be determined based on parameter values of stereo parameter values 158 corresponding to one or more non-adjacent frequency bands. For example, the stereo parameter conditioner 618 may determine a parameter value 310 of the frequency bin 2 in the frequency band 1 based on the parameter value 302 of the frequency band 0, the parameter value 306 of the frequency band 2, the parameter value 308 of the frequency band 3, or a combination thereof. The frequency band 0 and the frequency band 2 may be considered adjacent frequency bands of the frequency bin 2 because the frequency band 1 is adjacent to the frequency band 0 and the frequency band 2. The frequency band 3 may be considered a non-adjacent frequency band because the frequency band 1 is not adjacent to the frequency band 3.

The second stereo parameter values 159 includes the parameter value 302 corresponding to the frequency bin 0. The second stereo parameter values 159 includes a conditioned parameter value corresponding to each of the frequency bins 1-14. For example, the second stereo parameter values 159 include the parameter value 310 (e.g., a conditioned parameter value) corresponding to the frequency bin 2. The parameter value 310 may be based on curve-fitting the parameter value 302, the parameter value 308, the parameter value 304, and the parameter value 306. For example, the stereo parameter conditioner 618 may determine a line (e.g., a curved line) that intersects a mid-range of each band at the corresponding parameter value. The stereo parameter conditioner 618 may determine the second stereo parameter values 159 to approximate the line. The parameter value 310 may approximate a value of the line corresponding to the frequency bin 2. The parameter value 310 may thus be based on the stereo parameter values 158 corresponding to adjacent and non-adjacent frequency bands.

Referring to FIG. 4, an example of the stereo parameter values 158 and an example of the second stereo parameter values 159 is illustrated. The stereo parameter values 158 include a parameter value 402 corresponding to the frequency band 0, a parameter value 404 corresponding to the frequency band 1, a parameter value 406 corresponding to the frequency band 2, and a parameter value 408 corresponding to the frequency band 3.

Generating the second stereo parameter values 159 may include setting parameter values corresponding to frequency bins of some frequency bands to the same parameter value. For example, the stereo parameter conditioner 618 may determine that parameter values corresponding to frequency bands that are lower (or higher) than a frequency threshold (e.g., the frequency band 2) do not contribute significant spatial information. The stereo parameter conditioner 618 may generate the second stereo parameter values 159 to include constant parameter values for frequency bins corresponding to the lower (or higher) frequency bands. For example, the stereo parameter conditioner 618 may, in response to determining that the stereo parameter values 158 include the parameter value 406 corresponding to the frequency band 2, generate the second stereo parameter values 159 to include the parameter value 406 corresponding to the frequency bins 0-2 of the frequency band 0 and the frequency band 1. As another example, the stereo parameter conditioner 618 may generate the second stereo parameter values 159 to include the parameter value 408 corresponding to frequency bins of one or more frequency bands that are higher than the frequency band 3. The stereo parameter conditioner 618 may determine the parameter values corresponding to the remaining frequency bins based on an estimation (e.g., averaging, adjusting, curve fitting) function.

The stereo parameter conditioner 618 may perform linear adjustment based on the parameter value 406 and the parameter value 408 to determine the parameter values corresponding to at least some of the frequency bins of the frequency band 2 and the frequency band 3. The stereo parameter conditioner 618 may generate (or update) the second stereo parameter values 159 to include the parameter value 406 corresponding to each of the frequency bins 3-6 of the frequency band 2 and the parameter value 408 corresponding to each of the frequency bins 10-14 of the frequency band 3. The stereo parameter conditioner 618 may perform linear adjustment based on the parameter value 406 and the parameter value 408 to determine the parameter values corresponding to the frequency bins 7-9 of the frequency band 3 and may generate (or update) the second stereo parameter values 159 to include the parameter values corresponding to the frequency bins 7-9.

In FIG. 4, linear adjustment is performed to determine parameter values corresponding to the frequency bins 7-9 of the frequency band 3. In a particular aspect, the stereo parameter conditioner 618 may perform linear adjustment to determine parameter values corresponding to at least some frequency bins of the frequency band 2. In an alternate aspect, the stereo parameter conditioner 618 may perform adjustment (e.g., linear adjustment or non-linear adjustment) to determine parameter values corresponding to at least some frequency bins of the frequency band 2 and parameter values corresponding to at least some frequency bins of the frequency band 3. In a particular aspect, the stereo parameter conditioner 618 may determine whether to perform linear adjustment to determine parameter values corresponding to at least some frequency bins of the frequency band 2, the frequency band 3, or both, based on underlying signal characteristics (e.g., energy). For example, the stereo parameter conditioner 618 may perform linear adjustment to determine parameter values corresponding to frequency bins of a frequency band (e.g., the frequency band 2 or the frequency band 3) in response to determining that energy variance (or an average energy) of the frequency band satisfies (e.g., is greater than) a threshold.

As illustrated in FIG. 4, the parameter value 406 of the stereo parameter values 158 corresponding to the frequency band 2 is assigned to the frequency band 0 and the frequency band 1 in the second stereo parameter values 159. The same parameter value (e.g., the parameter value 406) may be assigned to one or more adjacent frequency bands in the second stereo parameter values 159 to reduce parameter transition in response to determining that the adjacent frequency bands have little or no impact on perceptual quality. Assigning the parameter value 406 to the frequency band 0 and the frequency band 1 may reduce (e.g., avoid) a transition in the value of the stereo parameter (corresponding to the stereo parameter values 158) between the frequency band 0 and the frequency band 1 and between the frequency band 1 and the frequency band 2. In an alternative implementation, the stereo parameter conditioner 618 may assign, based on the stereo parameter values 158, one or more other parameter values to the frequency bands 0, 1 and 2 in the second stereo parameter values 159. For example, the stereo parameter conditioner 618 may determine, based on the underlying mid signal, that the frequency band 0 has higher perceptual significance than the frequency bands 1 and 2. To illustrate, the stereo parameter conditioner 618 may determine that the frequency band 0 has higher perceptual significance than another frequency band (e.g., the frequency band 1 or the frequency band 2) in response to determining that a frequency bin of the frequency band 0 has higher energy than one or more (e.g., all) frequency bins of the other frequency band. The stereo parameter conditioner 618 may, in response to determining that the frequency band 0 has higher perceptual significance than the frequency bands 1 and 2, assign the parameter value 402 (corresponding to the frequency band 0) to the frequency bands 1 and 2 in the second stereo parameter values 159. As another example, the stereo parameter conditioner 618 may assign a weighted average of one or more of the stereo parameter values 158 (e.g., the parameter values 402, 404, and 406) to the frequency bands 0, 1 and 2 in the second stereo parameter values 159.

In a particular aspect, the stereo parameter conditioner 618 may adaptively determine the stereo parameter values 159. The adaptive determination may be based on relative energy distributions of frequency bands in the mid signal. For example, the stereo parameter conditioner 618 may adaptively determine whether to enable or disable replacement of one or more of the stereo parameter values 158 received via the bitstream 101 in the second stereo parameter values 159. To illustrate, the stereo parameter conditioner 618 may adaptively determine, based on relative energy distributions of the frequency bands 0, 1, and 2 in the mid signal, whether the parameter values 402, 404, and 406 of the stereo parameter values 158 are replaced with a single parameter value corresponding to the frequency bands 0, 1 and 2 in the second stereo parameter values 159. As another example, the stereo parameter conditioner 618 may adaptively determine a number of frequency bands (e.g., 2 frequency bands or 3 frequency bands) for which the corresponding parameter values of the stereo parameter value 158 are replaced by a single parameter value in the second stereo parameter values 159. To illustrate, the stereo parameter conditioner 618 may adaptively determine that the parameter value 402, the parameter value 404, and the parameter value 406 of the stereo parameter values 158 are to be replaced with a single parameter value corresponding to the frequency bands 0, 1, and 2 (e.g., 3 frequency bands) in the second stereo parameter values 159. Alternatively, the stereo parameter conditioner 618 may adaptively determine that the parameter value 402 and the parameter value 404 are to be replaced with a single parameter value corresponding to the frequency bands 0 and 1 (e.g., 2 frequency bands) in the second stereo parameter values 159, whereas the parameter value 406 corresponds to the frequency band 2 in the second stereo parameter values 159. It should be noted that specific frequency bands (e.g., the frequency bands 1 or 2) are used for illustrative purposes and are non-limiting. In various implementations, any combination of frequency bands may be used.

In a particular aspect, the stereo parameter conditioner 618 may perform local adjustment of the stereo parameter values 158 of a stereo parameter (e.g., IPD) to determine a first subset of the second stereo parameter values 159 and may perform overall adjustment of the stereo parameter values 158 to determine a second subset of the second stereo parameter values 159. For example, as illustrated in FIG. 4, assigning the parameter value 406 of the frequency band 2 to the frequency band 0 may correspond to an overall (e.g., global) adjustment of the stereo parameter values 158 because the frequency band 2 is non-adjacent to the frequency band 0. One or more parameter values of the second stereo parameter values 159 assigned to the frequency band 3 may correspond to a local adjustment of the stereo parameter values 158 because the one or more parameter values are based on the parameter values of the stereo parameter values 158 that correspond to the frequency band 2 and the frequency band 3, where the frequency band 2 is adjacent to the frequency band 3.

Referring to FIG. 5, an example of the stereo parameter values 158 and an example of the second stereo parameter values 159 is illustrated. The stereo parameter values 158 include a parameter value 502 corresponding to the frequency band 0, a parameter value 504 corresponding to the frequency band 1, a parameter value 506 corresponding to the frequency band 2, and a parameter value 508 corresponding to the frequency band 3.

The stereo parameter conditioner 618 of FIG. 1 may generate the second stereo parameter values 159 by performing an adjustment on parameter values of frequency bands. For example, the stereo parameter conditioner 618 may determine parameter values of frequency bins of a frequency band based on a difference between a parameter value of the frequency band and a parameter value of an adjacent frequency band. To illustrate, the stereo parameter conditioner 618 may determine a parameter value 510 corresponding the frequency bin 7 based on a difference between the parameter value 508 of the frequency band 3 and the parameter value 506 of the frequency band 2, where the frequency band 2 is adjacent to the frequency band 3. An amount (e.g., a portion) of the difference (e.g., parameter value 506—parameter value 508) corresponding to a particular frequency bin (e.g., the frequency bin 7) may be based on an underlying signal characteristic (e.g., mid signal energy), as described herein. More specifically, the stereo parameter conditioner 618 of FIG. 1 may generate the second stereo parameter values 159 by performing a piece-wise linear adjustment on parameter values of frequency bands. For example, the stereo parameter conditioner 618 may determine parameter values of frequency bins of a frequency band based on a difference between a parameter value of the frequency band and a parameter value of an adjacent frequency band. An amount of the difference corresponding to a particular frequency bin may be proportional to an underlying signal characteristic (e.g., mid signal energy).

In a particular aspect, an overall (e.g., global) adjustment of the stereo parameter values 158 may be based on the underlying signal characteristics. For example, the stereo parameter conditioner 618 may perform curve fitting to determine a curve (e.g., a best fit curve) by reducing (e.g., minimizing) a weighted error. In this example, the weighted error may be determined using weights that correspond to energies corresponding to frequency bins of the underlying mid signal, and the error values may be determined based on differences between the second stereo parameter values 159 and the stereo parameter values 158 received by the device 106.

In a particular aspect, the stereo parameter conditioner 618 may perform piece-wise linear adjustment on a frequency band that is higher (or lower) than a particular frequency band (e.g., the frequency band 2). For example, the stereo parameter conditioner 618 may, in response to determining that the frequency band 0 and the frequency band 1 are lower than the frequency band 2, refrain from performing piece-wise linear adjustment to determine parameter values corresponding to frequency bins of the frequency bins 0-2. The stereo parameter conditioner 618 may, as illustrated in FIG. 5, generate the second stereo parameter values 159 to include the parameter value 502 corresponding to the frequency bin 0 and the parameter value 504 corresponding to each of the frequency bins 1-2. In an alternate aspect, the stereo parameter conditioner 618 may generate the second stereo parameter values 159 to include the parameter value 506 corresponding to the frequency bins 0-2.

In a particular aspect, the stereo parameter conditioner 618 may perform piece-wise linear adjustment on a frequency band that includes at least a threshold number (e.g., 5) frequency bins. The stereo parameter conditioner 618 may, in response to determining that the frequency band 2 includes a number (e.g., 4) of frequency bins that is less than the threshold number (e.g., 5) of frequency bins, refrain from performing piece-wise linear adjustment to determine parameter values corresponding to frequency bins of the frequency band 2. The stereo parameter conditioner 618 may generate (or update) the second stereo parameter values 159 to include the parameter value 506 corresponding to each of the frequency bins 3-6 of the frequency band 2.

The stereo parameter conditioner 618 may, in response to determining that the frequency band 3 is higher than the frequency band 2, that a count (e.g., 8) of frequency bins of the frequency band 3 exceeds the threshold number (e.g., 5) of frequency bins, or both, determine parameter values corresponding to the frequency bins 7-10 by performing piece-wise linear adjustment based on the parameter value 506 and the parameter value 508. For example, the stereo parameter conditioner 618 may spread the difference between the parameter value 506 and the parameter value 508 over the frequency bins 7-10.The stereo parameter conditioner 618 may determine a proportion of the difference corresponding to a particular bin based on an underlying signal characteristic (e.g., a mid signal energy) corresponding to the particular bin. A difference between the parameter value corresponding to the frequency bin 7 and the parameter value corresponding to the frequency bin 8 may be same as, or distinct from a difference between the parameter value corresponding to the frequency bin 8 and the parameter value corresponding to the frequency bin 9. For example, a first slope of a line 512 (e.g., a straight line) between the parameter value corresponding to the frequency bin 7 and the parameter value corresponding to the frequency bin 8 may be the same as, or distinct from, a second slope of a line 514 (e.g., a straight line) between the parameter value corresponding to the frequency bin 8 and the parameter value corresponding to the frequency bin 9. The first slope and the second slope may be based on the underlying signal characteristics (e.g., a mid signal energy) corresponding to the frequency bins 7-9.

The stereo parameter conditioner 618 may thus determine at least some of the second stereo parameter values 159 by performing piece-wise linear adjustment that is based on underlying signal characteristics of the corresponding frequency bins. The underlying signal characteristics of a frequency bin may indicate whether a difference between a parameter value of the frequency bin and a parameter value of an adjacent bin is likely to be more or less perceptible in an output signal generated by the decoder 118 of FIG. 1. Performing piece-wise linear adjustment based on the underlying signal characteristics may reduce (e.g., minimize) perceptible artifacts in the output signal.

Referring to FIG. 6, a diagram illustrating a particular implementation of the decoder 118 is shown. The decoder 118 includes a demultiplexer (DEMUX) 602, the mid signal decoder 604, the transform unit 606, the up-mixer 610, the side signal decoder 612, the transform unit 614, the stereo decoder 616, the stereo parameter conditioner 618, the inverse transform unit 622, and the inverse transform unit 624. The up-mixer 610 includes a stereo processor 620.

The bitstream 101 is provided to the demultiplexer 602. The bitstream 101 includes the encoded mid signal 102, the encoded side signal 103, and the encoded stereo parameter information 158. The demultiplexer 602 is configured to extract the encoded mid signal 102 from the bitstream 101 and provide the encoded mid signal 102 to the mid signal decoder 604. The demultiplexer 602 may also be configured to extract the encoded side signal 103 from the bitstream 101 and provide the encoded side signal 103 to the side signal decoder 612. The demultiplexer 602 may also be configured to extract the encoded stereo parameter information 158 from the bitstream 101 and provide the encoded stereo parameter information 158 to the stereo decoder 616.

The mid signal decoder 604 is configured to decoded the encoded mid signal 102 to generate a decoded mid signal 630 (e.g., a mid-band signal ($m_{CODED}(t)$)). The decoded mid signal 630 is provided to the transform unit 606. The transform unit 606 is configured to perform a transform operation on the decoded mid signal 630 to generate a frequency-domain decoded mid signal ($M_{CODED}(b)$) 632. For example, the transform unit 602 may perform a Discrete Fourier Transform (DFT) operation on the decoded mid signal 630 to generate the frequency-domain decoded mid signal 632. The transform unit 606 may implement a decoder-side windowing scheme that uses second windows having a second overlap size that is smaller than the first overlap size. The frequency-domain decoded mid signal 632 is provided to the up-mixer 610.

The side signal decoder 612 is configured to decode the encoded side signal 103 to generate a decoded side signal 634. The decoded side signal 634 is provided to the transform unit 614. The transform unit 614 is configured to perform a transform operation on the decoded side signal 634 to generate a frequency-domain decoded side signal 636. For example, the transform unit 602 may perform a DFT operation on the decoded side signal 634 to generate the frequency-domain side signal 636. The transform unit 614 may implement the decoder-side windowing scheme that uses second windows having a second overlap size that is smaller than the first overlap size. The frequency-domain side signal 636 is provided to the up-mixer 610.

The stereo decoder 616 is configured to decode the encoded stereo parameter information 158 to determine the first value 151 of the stereo parameter and the second value 155 of the stereo parameter. The first value 151 is associated with the first frequency range 152, and the first value 151 is determined using the encoder-side windowing scheme (of the encoder 114 of FIG. 1) that uses first windows having a first overlap size. The second value 155 is associated with the second frequency range 156, and the second value 155 is determined also determined using the encoder-side windowing scheme. The first value 151 of the stereo parameter and the second value 155 of the stereo parameter is provided to the stereo parameter conditioner 618.

Additionally, the stereo decoder 638 may determine stereo parameter values 638 (including the first value 151 and the second value 155) for each stereo parameter encoded into the bitstream 101 in response to decoding the encoded stereo parameter information 158. The stereo parameter values 638 are provided to the up-mixer 610. According to one implementation, the stereo parameter values 638 are also provided to the stereo parameter conditioner 618.

The stereo parameter conditioner 618 is configured to perform a conditioning operation on the first value 151 and the second value 155 to generate a conditioned value 640 of the stereo parameter. The conditioned value 640 may be associated with the particular frequency range 170 that is a subset of the first frequency range 152 or a subset of the second frequency range 156. For example, the stereo parameter conditioner 618 may apply an estimation function to the first value 151 and the second value 155. The estimation function may include an averaging function, an adjustment function, or a curve-fitting function. If the particular frequency range 170 is a subset of the first frequency range 152, the conditioned value 640 is distinct from the first value 151. If the particular frequency range 170 is a subset of the second frequency range 156, the conditioned value 640 is distinct from the second value 155. The conditioned value 640 is provided to the up-mixer 610. The stereo parameter conditioner 618 may also be configured to generate one or more additional conditional values (not shown) of the stereo parameter based on the conditioning operation. Each conditional value of the one or more additional conditional values is associated with a corresponding frequency range that is a subset of the first frequent range 152 or a subset of the second frequency range 156.

The up-mixer 610 is configured to perform an up-mix operation on the frequency-domain decoded mid signal 632 (and optionally the frequency-domain decoded side signal 636) to generate a first frequency-domain output signal 642 and a second frequency-domain output signal 644. During the up-mix operation, the stereo processor 620 of the up-mixer 610 may apply the stereo parameter values 638 to the frequency-domain decoded mid signal 632 (and optionally the frequency-domain decoded side signal 636). Additionally, during the up-mix operation, the stereo processor 630 may apply the conditioned value 640 to the frequency-domain decoded mid signal 632 (and optionally the frequency-domain decoded side signal 636). The first frequency-domain output signal 642 is provided to the inverse transform unit 622, and the second frequency-domain output signal 644 is provided to the inverse transform unit 624.

The inverse transform unit 622 is configured to perform an inverse transform operation on the first frequency-domain output signal 642 to generate the first output signal 126. For example, the inverse transform unit 622 may perform an inverse DFT (IDFT) operation on the first frequency-domain output signal 642 to genera the first output signal 126. The second inverse transform unit 624 is configured to perform an inverse transform operation on the second frequency-domain output signal 644 to generate the second output signal 128. For example, the second inverse transform unit 624 may perform an IDFT operation on the second frequency-domain output signal 644 to generate the output signal 128.

An encoder, such as the encoder 114 of FIG. 1, is configured to apply a first windowing scheme (e.g., the encoder-side windowing scheme) associated with first window parameters. The transform units 606, 614 are configured to apply a second windowing scheme (e.g., the decoder-side windowing scheme) associated with second window parameters. The second windowing parameters associated with the second windowing scheme used by the transforms units 606, 614 may be different from first window parameters associated with first windowing scheme used by the encoder 114. The transforms units 606, 614 may use the second windowing scheme to reduce delay in decoding. For example, the second windowing scheme (applied by the decoder 118) may include windows having a same size as the windows used in the first windowing scheme (applied by the encoder 114) so that the transform results in same frequency bands, but an amount of window overlap may be reduced. To illustrate, the decoder 118 may apply a second window overlap size to generate the first output signal 126, the second output signal 128, or both, that is distinct from a first window overlap size used by the encoder 114 to encode the first audio signal 130, the second audio signal 132, or both. Reducing the amount of window overlap reduces a decoding delay of processing overlapped samples from a prior window. Because the first value 151 and the second value 155 may be generated based on the first windowing scheme (applied by the encoder 114), the decoder 118 may generate the conditioned value 640 to account for differences in the windowing schemes, as described with reference to FIGS. 1-5. For example, the decoder 118 (e.g., the stereo parameter conditioner 618) may generate the stereo parameter values via interpolation (e.g., weighted sums) of the received stereo parameter values. Similarly, the inverse transform units 622, 624 are configured to perform inverse transforms to return frequency-domain signals to overlapping windowed time-domain signals.

Although the stereo down-mixing and stereo up-mixing techniques described with respect FIG. 6 are associated with a single channel, the similar techniques may be used to perform down-mixing and up-mixing for multiple channels. For example, the stereo parameter conditioner techniques described with respect to FIG. 6 may be extended to a multi-channel system where the stereo parameter conditioner is based on spatial side information (e.g., gain, phase, temporal mismatch, etc.) from one or more channels.

Figure 7:
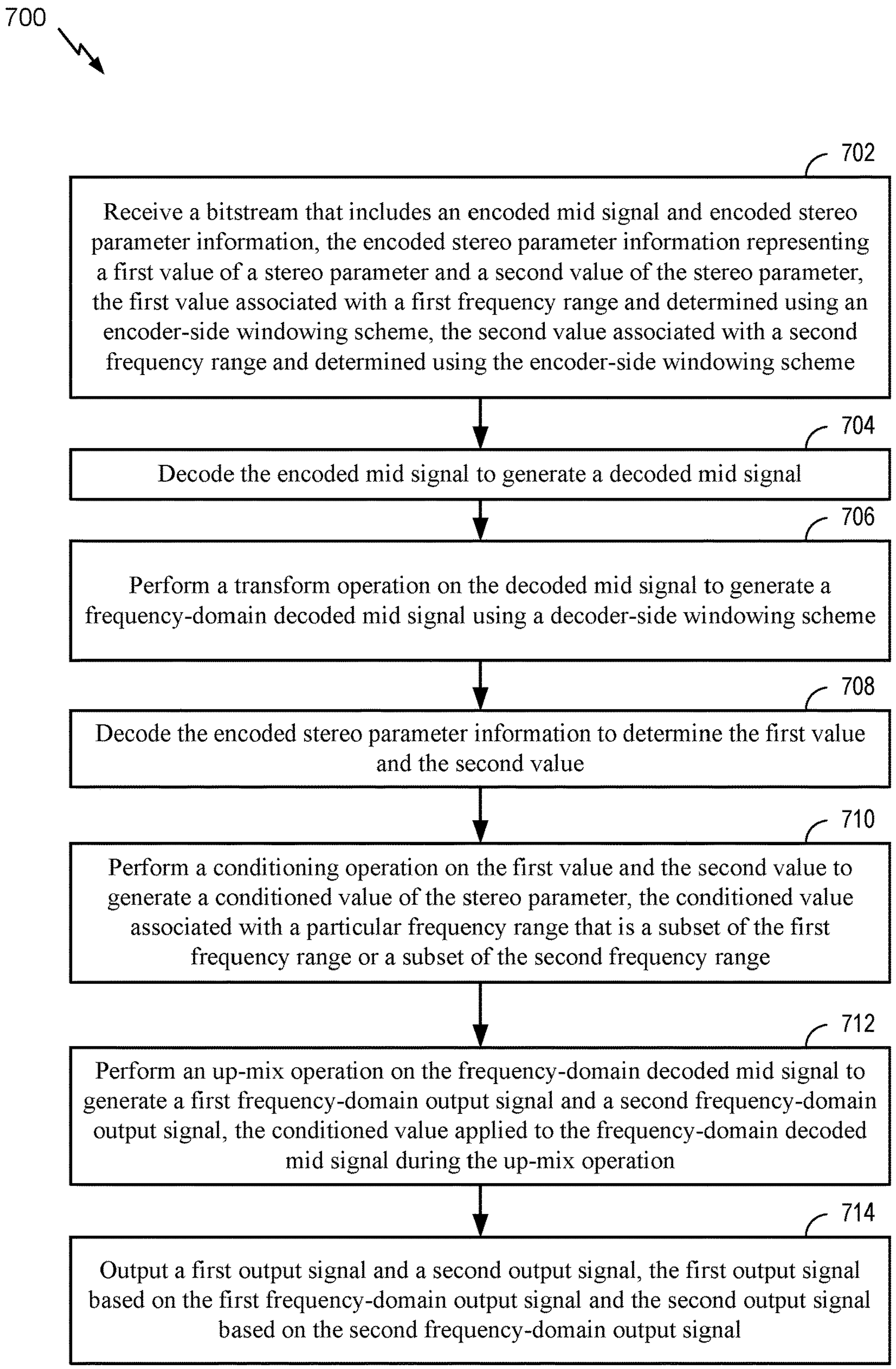
FIG. 7 is a flow chart illustrating a particular method of parametric audio decoding.

Referring to FIG. 7, a flowchart of a method 700 is shown. The method 700 may be performed by the second device 106, the decoder 118, the stereo parameter conditioner 618 of FIG. 1, or a combination thereof.

The method 700 includes receiving, at a decoder, a bitstream that includes an encoded mid signal and encoded stereo parameter information, at 702. The encoded stereo parameter information may represent a first value of a stereo parameter and a second value of the stereo parameter. The first value may be associated with a first frequency range, and the first value may be determined using an encoder-side windowing scheme. The second value may be associated with a second frequency range, and the second value may be determined using the encoder-side windowing scheme. For example, referring to FIG. 6, the demultiplexer 602 of the decoder 118 may receive the bitstream 101 that includes the encoded mid signal 102, the encoded side signal 103, and the encoded stereo parameter information 158. The encoder-side windowing scheme may use first windows having a first overlap size.

The method 700 also includes decoding the encoded mid signal to generate a decoded mid signal, at 704. For example, referring to FIG. 6, the mid signal decoder 604 may decoded the encoded mid signal 102 to generate the decoded mid signal 630.

The method 700 further includes performing a transform operation on the decoded mid signal to generate a frequency-domain decoded mid signal using a decoder-side windowing scheme, at 706. For example, referring to FIG. 6, the transform unit 606 may perform the transform operation on the decoded mid signal 630 to generate the frequency-domain decoded mid signal 632. The decoder-side windowing scheme may use second windows having a second overlap size. The second overlap size associated with the decoder-side windowing scheme is different than the first overlap size associated with the encoder-side windowing scheme. For example, the second overlap size is smaller than the first overlap size. Additionally, first zero-padding operations may be performed at the encoder 114 in conjunction with the encoder-side windowing scheme and second zero-padding operations may be performed at the decoder 118 in conjunction with the decoder-side windowing scheme.

The method 700 also includes decoding the encoded stereo parameter information to determine the first value and the second value, at 708. For example, referring to FIG. 6, the stereo decoder 616 may decode the encoded stereo parameter information 158 to determine the first value 151 and the second value 155.

The method 700 further includes performing a conditioning operation on the first value and the second value to generate a conditioned value of the stereo parameter, at 710. The conditioned value may be associated with a particular frequency range that is a subset of the first frequency range or a subset of the second frequency range. For example, referring to FIG. 6, the stereo parameter conditioner 618 may perform the conditioning operation on the first value 151 and the second value 155 to generate the conditioned value 640.

The method 700 also includes performing an up-mix operation on the frequency-domain decoded mid signal to generate a first frequency-domain output signal and a second frequency-domain output signal, at 712. The conditioned value may be applied to the frequency-domain decoded mid signal during the up-mix operation. For example, referring to FIG. 6, the up-mixer 610 may perform the up-mix operation on the frequency-domain decoded mid signal 632 to generate the first frequency-domain output signal 642 and the second frequency-domain output signal 642.

According to one implementation, the method 700 may include performing a first inverse transform operation on the first frequency-domain output signal to generate a first output signal. For example, referring to FIG. 6, the inverse transform unit 622 may perform the inverse transform operation on the first frequency-domain output signal 642 to generate the first output signal 126. According to one implementation, the method 700 may include performing a second inverse transform operation on the second frequency-domain output signal to generate a second output signal. For example, referring to FIG. 6, the inverse transform unit 624 may perform the inverse transform operation on the second frequency-domain output signal 644 to generate the second output signal 128.

The method 700 also includes outputting a first output signal and a second output signal, at 714. The first output signal may be based on the first frequency-domain output signal, and the second output signal may be based on the second frequency-domain output signal. For example, referring to FIG. 1, the first loudspeaker 142 may output the first output signal 126, and the second loudspeaker 144 may output the second output signal 128.

The method 700 may thus enable the decoder 118 to generate the first output signal 126 based on the conditioned value 640. Differences between the conditioned parameter value 640 and parameter values applied to one or more adjacent frequency ranges (e.g., frequency bins) may be lower than a difference between the first parameter value 151 and the second parameter value 155. The lower differences between parameter values applied to adjacent frequency ranges may result in fewer artifacts in the first output signal 126.

Figure 8:
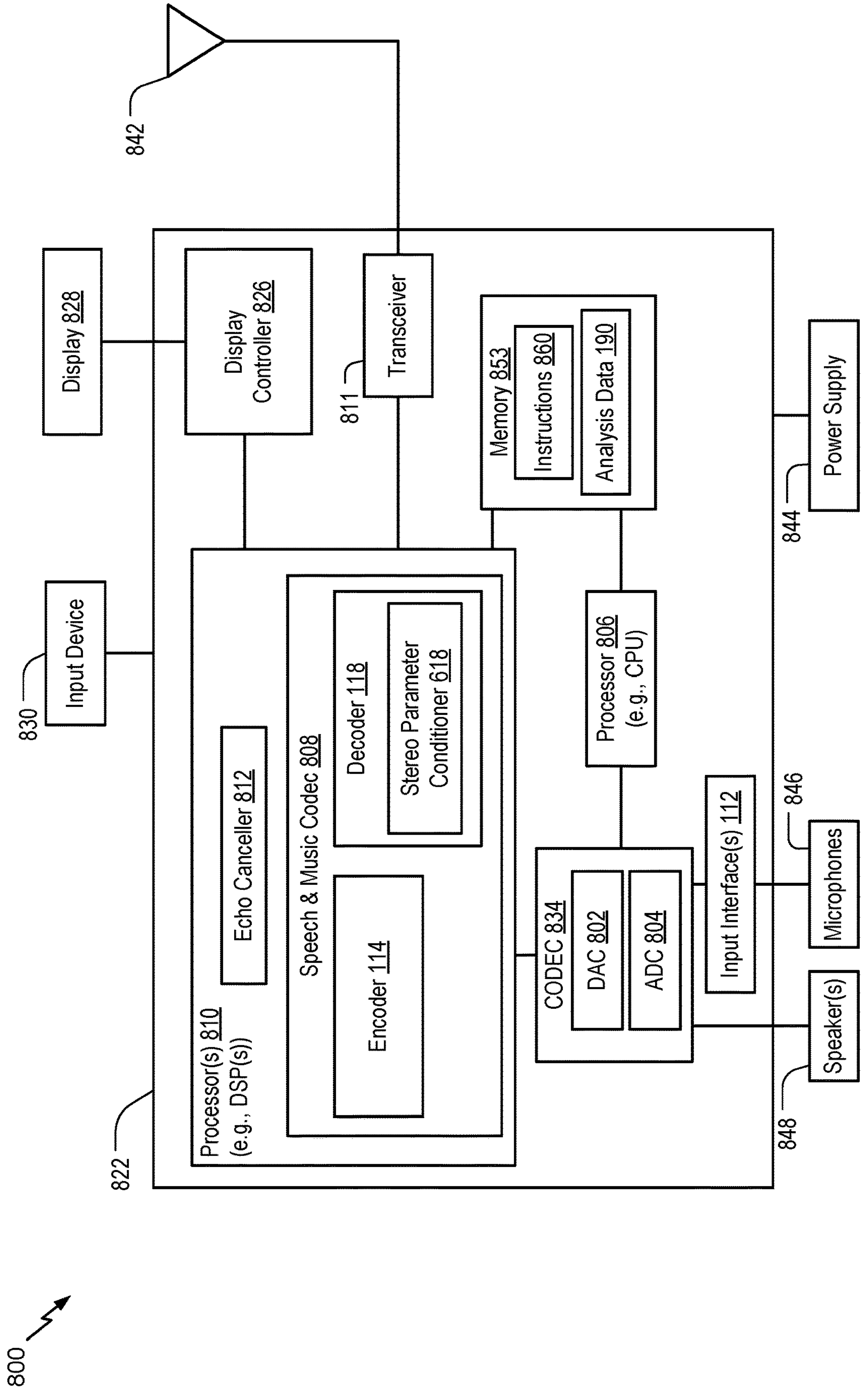
FIG. 8 is a block diagram of a particular illustrative example of a device that is operable to perform the techniques described with respect to FIGS. 1-7.

Referring to FIG. 8, a block diagram of a particular illustrative example of a device (e.g., a wireless communication device) is depicted and generally designated 800. In various implementations, the device 800 may have fewer or more components than illustrated in FIG. 8. In an illustrative implementation, the device 800 may correspond to the first device 104 or the second device 106 of FIG. 1. In an illustrative implementation, the device 800 may perform one or more operations described with reference to systems and methods of FIGS. 1-7.

In a particular implementation, the device 800 includes a processor 806 (e.g., a central processing unit (CPU)). The device 800 includes one or more additional processors 810 (e.g., one or more digital signal processors (DSPs)). The processors 810 include a media (e.g., speech and music) coder-decoder (CODEC) 808, and an echo canceller 812. The media CODEC 808 includes the decoder 118, the encoder 114, or both.

The device 800 includes a memory 853 and a CODEC 834. Although the media CODEC 808 is illustrated as a component of the processors 810 (e.g., dedicated circuitry and/or executable programming code), in other implementations one or more components of the media CODEC 808, such as the decoder 118, the encoder 114, or both, may be included in the processor 806, the CODEC 834, another processing component, or a combination thereof.

The device 800 includes a transceiver 811 coupled to an antenna 842. The transceiver 811 may include the transmitter 110, the receiver 111 of FIG. 1, or both. The device 800 includes a display 828 coupled to a display controller 826. One or more speakers 848 may be coupled to the CODEC 834. One or more microphones 846 may be coupled, via the input interface(s) 112, to the CODEC 834. In a particular aspect, the speakers 848 may include the first loudspeaker 142, the second loudspeaker 144 of FIG. 1, or both. In a particular implementation, the microphones 846 may include the first microphone 146, the second microphone 148 of FIG. 1, or both. The CODEC 834 includes a digital-to-analog converter (DAC) 802 and an analog-to-digital converter (ADC) 804.

The memory 853 includes instructions 860 executable by the processor 806, the processors 810, the CODEC 834, another processing unit of the device 800, or a combination thereof, to perform one or more operations described with reference to FIGS. 1-7. The memory 853 may store the analysis data 190.

One or more components of the device 800 may be implemented via dedicated hardware (e.g., circuitry), by a processor executing instructions to perform one or more tasks, or a combination thereof. As an example, the memory 853 or one or more components of the processor 806, the processors 810, and/or the CODEC 834 may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 860) that, when executed by a computer (e.g., a processor in the CODEC 834, the processor 806, and/or the processors 810), may cause the computer to perform one or more operations described with reference to FIGS. 1-7. As an example, the memory 853 or the one or more components of the processor 806, the processors 810, and/or the CODEC 834 may be a non-transitory computer-readable medium that includes instructions (e.g., the instructions 860) that, when executed by a computer (e.g., a processor in the CODEC 834, the processor 806, and/or the processors 810), cause the computer perform one or more operations described with reference to FIGS. 1-7.

In a particular implementation, the device 800 may be included in a system-in-package or system-on-chip device (e.g., a mobile station modem (MSM)) 822. In a particular implementation, the processor 806, the processors 810, the display controller 826, the memory 853, the CODEC 834, and a transceiver 811 are included in a system-in-package or the system-on-chip device 822. In a particular implementation, an input device 830, such as a touchscreen and/or keypad, and a power supply 844 are coupled to the system-on-chip device 822. Moreover, in a particular implementation, as illustrated in FIG. 8, the display 828, the input device 830, the speakers 848, the microphones 846, the antenna 842, and the power supply 844 are external to the system-on-chip device 822. However, each of the display 828, the input device 830, the speakers 848, the microphones 846, the antenna 842, and the power supply 844 can be coupled to a component of the system-on-chip device 822, such as an interface or a controller.

The device 800 may include a wireless telephone, a mobile device, a mobile phone, a smart phone, a cellular phone, a laptop computer, a desktop computer, a computer, a tablet computer, a set top box, a personal digital assistant (PDA), a display device, a television, a gaming console, a music player, a radio, a video player, an entertainment unit, a communication device, a fixed location data unit, a personal media player, a digital video player, a digital video disc (DVD) player, a tuner, a camera, a navigation device, a decoder system, an encoder system, a base station, a vehicle, or any combination thereof.

In a particular implementation, one or more components of the systems described herein and the device 800 may be integrated into a decoding system or apparatus (e.g., an electronic device, a CODEC, or a processor therein), into an encoding system or apparatus, or both. In other implementations, one or more components of the systems described herein and the device 800 may be integrated into a wireless communication device (e.g., a wireless telephone), a tablet computer, a desktop computer, a laptop computer, a set top box, a music player, a video player, an entertainment unit, a television, a game console, a navigation device, a communication device, a personal digital assistant (PDA), a fixed location data unit, a personal media player, a base station, a vehicle, or another type of device.

It should be noted that various functions performed by the one or more components of the systems described herein and the device 800 are described as being performed by certain components or modules. This division of components and modules is for illustration only. In an alternate implementation, a function performed by a particular component or module may be divided amongst multiple components or modules. Moreover, in an alternate implementation, two or more components or modules of the systems described herein may be integrated into a single component or module. Each component or module illustrated in systems described herein may be implemented using hardware (e.g., a field-programmable gate array (FPGA) device, an application-specific integrated circuit (ASIC), a DSP, a controller, etc.), software (e.g., instructions executable by a processor), or any combination thereof.

In conjunction with the described aspects, an apparatus includes means for receiving a bitstream that includes an encoded mid signal and encoded stereo parameter information. The encoded stereo parameter information represents a first value of a stereo parameter and a second value of the stereo parameter. The first value is associated with a first frequency range, and the first value is determined using an encoder-side windowing scheme. The second value is associated with a second frequency range, and the second value is determined using the encoder-side windowing scheme. For example, the means for receiving may include the receiver 111 of FIG. 1, the demultiplexer 602 of FIG. 6, the transceiver 811, the antenna 842 of FIG. 8, one or more other devices, circuits, or modules.

The apparatus may also include means for decoding the encoded mid signal to generate a decoded mid signal. For example, the means for decoding the encoded mid signal may include the decoder 118 of FIG. 1, the mid signal decoder 630 of FIG. 6, the media CODEC 808, the processors 810, the CODEC 834, the processor 806 of FIG. 8, one or more other devices, circuits, or modules.

The apparatus also may also include means for performing a transform operation on the decoded mid signal to generate a frequency-domain decoded mid signal operation using a decoder-side windowing scheme. For example, the means for performing the transform operation may include the decoder 118 of FIG. 1, the transform unit 606 of FIG. 6, the media CODEC 808, the processors 810, the CODEC 834, the processor 806 of FIG. 8, one or more other devices, circuits, or modules.

The apparatus may also include means for decoding the encoded stereo parameter information to determine the first value and the second value. For example, the means for decoding the encoded stereo parameter information may include the decoder 118 of FIG. 1, the stereo decoder 616 of FIG. 6, the media CODEC 808, the processors 810, the CODEC 834, and the processor 806 of FIG. 8, one or more other devices, circuits, or modules.

The apparatus may also include means for performing a conditioning operation on the first value and the second value to generate a conditioned value of the stereo parameter. The conditioned value is associated with a particular frequency range that is a subset of the first frequency range or a subset of the second frequency range. For example, the means for performing the conditioning operation may include the decoder 118 of FIG. 1, the stereo parameter conditioner 618 of FIG. 6, the media CODEC 808, the processors 810, the CODEC 834, the processor 806 of FIG. 8, one or more other devices, circuits, or modules.

The apparatus may also include means for performing an up-mix operation on the frequency-domain decoded mid signal to generate a first frequency-domain output signal and a second frequency-domain output signal. The conditioned value is applied to the frequency-domain decoded mid signal during the up-mix. For example, the means for performing the up-mix operation may include the decoder 118 of FIG. 1, the up-mixer 610 of FIG. 6, the stereo processor 620 of FIG. 6, the media CODEC 808, the processors 810, the CODEC 834, and the processor 806 of FIG. 8, one or more other devices, circuits, or modules.

The apparatus may also include means for outputting a first output signal and a second output signal. The first output signal is based on the first frequency-domain output signal, and the second output signal is based on the second frequency-domain output signal. For example, the means for outputting may include the loudspeaker 142, 144 of FIG. 1, the speakers 848 of FIG. 8, one or more other devices, circuits, or modules.

Figure 9:
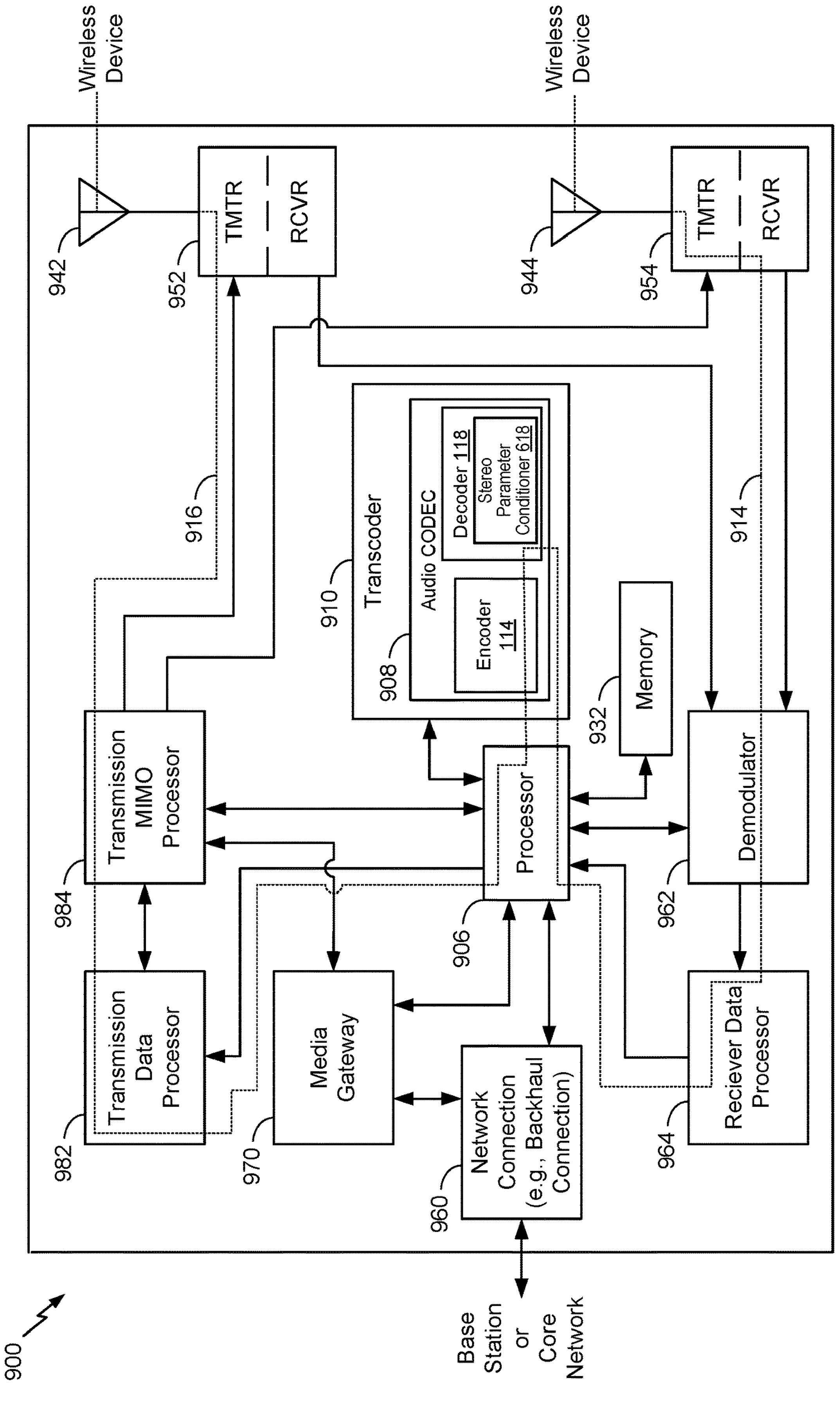
FIG. 9 is a block diagram of a particular illustrative example of a base station that is operable to perform the techniques described with respect to FIGS. 1-8.

Referring to FIG. 9, a block diagram of a particular illustrative example of a base station 900 is depicted. In various implementations, the base station 900 may have more components or fewer components than illustrated in FIG. 9. In an illustrative example, the base station 900 may include the first device 104, the second device 106 of FIG. 1, or both. In an illustrative example, the base station 900 may operate according to the method of FIG. 7.

The base station 900 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the device 800 of FIG. 8.

Various functions may be performed by one or more components of the base station 900 (and/or in other components not shown), such as sending and receiving messages and data (e.g., audio data). In a particular example, the base station 900 includes a processor 906 (e.g., a CPU). The base station 900 may include a transcoder 910. The transcoder 910 may include an audio CODEC 908 (e.g., a speech and music CODEC). For example, the transcoder 910 may include one or more components (e.g., circuitry) configured to perform operations of the audio CODEC 908. As another example, the transcoder 910 is configured to execute one or more computer-readable instructions to perform the operations of the audio CODEC 908. Although the audio CODEC 908 is illustrated as a component of the transcoder 910, in other examples one or more components of the audio CODEC 908 may be included in the processor 906, another processing component, or a combination thereof. For example, the decoder 114 (e.g., a vocoder decoder) may be included in a receiver data processor 964. As another example, the encoder 114 (e.g., a vocoder encoder) may be included in a transmission data processor 982.

The transcoder 910 may function to transcode messages and data between two or more networks. The transcoder 910 is configured to convert message and audio data from a first format (e.g., a digital format) to a second format. To illustrate, the decoder 114 may decode encoded signals having a first format and the encoder 114 may encode the decoded signals into encoded signals having a second format. Additionally or alternatively, the transcoder 910 is configured to perform data rate adaptation. For example, the transcoder 910 may downconvert a data rate or upconvert the data rate without changing a format the audio data. To illustrate, the transcoder 910 may downconvert 64 kbit/s signals into 16 kbit/s signals. The audio CODEC 908 may include the encoder 114 and the decoder 114. The decoder 114 may include the stereo parameter conditioner 618.

The base station 900 may include a memory 932. The memory 932, such as a computer-readable storage device, may include instructions. The instructions may include one or more instructions that are executable by the processor 906, the transcoder 910, or a combination thereof, to perform the method of FIG. 7. The base station 900 may include multiple transmitters and receivers (e.g., transceivers), such as a first transceiver 952 and a second transceiver 954, coupled to an array of antennas. The array of antennas may include a first antenna 942 and a second antenna 944. The array of antennas is configured to wirelessly communicate with one or more wireless devices, such as the device 800 of FIG. 8. For example, the second antenna 944 may receive a data stream 914 (e.g., a bitstream) from a wireless device. The data stream 914 may include messages, data (e.g., encoded speech data), or a combination thereof.

The base station 900 may include a network connection 960, such as backhaul connection. The network connection 960 is configured to communicate with a core network or one or more base stations of the wireless communication network. For example, the base station 900 may receive a second data stream (e.g., messages or audio data) from a core network via the network connection 960. The base station 900 may process the second data stream to generate messages or audio data and provide the messages or the audio data to one or more wireless device via one or more antennas of the array of antennas or to another base station via the network connection 960. In a particular implementation, the network connection 960 may be a wide area network (WAN) connection, as an illustrative, non-limiting example. In some implementations, the core network may include or correspond to a Public Switched Telephone Network (PSTN), a packet backbone network, or both.

The base station 900 may include a media gateway 970 that is coupled to the network connection 960 and the processor 906. The media gateway 970 is configured to convert between media streams of different telecommunications technologies. For example, the media gateway 970 may convert between different transmission protocols, different coding schemes, or both. To illustrate, the media gateway 970 may convert from PCM signals to Real-Time Transport Protocol (RTP) signals, as an illustrative, non-limiting example. The media gateway 970 may convert data between packet switched networks (e.g., a Voice Over Internet Protocol (VoIP) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 970 may include a transcoder, such as the transcoder 910, and is configured to transcode data when codecs are incompatible. For example, the media gateway 970 may transcode between an Adaptive Multi-Rate (AMR) codec and a G.711 codec, as an illustrative, non-limiting example. The media gateway 970 may include a router and a plurality of physical interfaces. In some implementations, the media gateway 970 may also include a controller (not shown). In a particular implementation, the media gateway controller may be external to the media gateway 970, external to the base station 900, or both. The media gateway controller may control and coordinate operations of multiple media gateways. The media gateway 970 may receive control signals from the media gateway controller and may function to bridge between different transmission technologies and may add service to end-user capabilities and connections.

The base station 900 may include a demodulator 962 that is coupled to the transceivers 952, 954, the receiver data processor 964, and the processor 906, and the receiver data processor 964 may be coupled to the processor 906. The demodulator 962 is configured to demodulate modulated signals received from the transceivers 952, 954 and to provide demodulated data to the receiver data processor 964. The receiver data processor 964 is configured to extract a message or audio data from the demodulated data and send the message or the audio data to the processor 906.

The base station 900 may include a transmission data processor 982 and a transmission multiple input-multiple output (MIMO) processor 984. The transmission data processor 982 may be coupled to the processor 906 and the transmission MIMO processor 984. The transmission MIMO processor 984 may be coupled to the transceivers 952, 954 and the processor 906. In some implementations, the transmission MIMO processor 984 may be coupled to the media gateway 970. The transmission data processor 982 is configured to receive the messages or the audio data from the processor 906 and to code the messages or the audio data based on a coding scheme, such as CDMA or orthogonal frequency-division multiplexing (OFDM), as an illustrative, non-limiting examples. The transmission data processor 982 may provide the coded data to the transmission MIMO processor 984.

The coded data may be multiplexed with other data, such as pilot data, using CDMA or OFDM techniques to generate multiplexed data. The multiplexed data may then be modulated (i.e., symbol mapped) by the transmission data processor 982 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by processor 906.

The transmission MIMO processor 984 is configured to receive the modulation symbols from the transmission data processor 982 and may further process the modulation symbols and may perform beamforming on the data. For example, the transmission MIMO processor 984 may apply beamforming weights to the modulation symbols. The beamforming weights may correspond to one or more antennas of the array of antennas from which the modulation symbols are transmitted.

During operation, the second antenna 944 of the base station 900 may receive a data stream 914. The second transceiver 954 may receive the data stream 914 from the second antenna 944 and may provide the data stream 914 to the demodulator 962. The demodulator 962 may demodulate modulated signals of the data stream 914 and provide demodulated data to the receiver data processor 964. The receiver data processor 964 may extract audio data from the demodulated data and provide the extracted audio data to the processor 906.

The processor 906 may provide the audio data to the transcoder 910 for transcoding. The decoder 118 of the transcoder 910 may decode the audio data from a first format into decoded audio data and the encoder 114 may encode the decoded audio data into a second format. In some implementations, the encoder 114 may encode the audio data using a higher data rate (e.g., upconvert) or a lower data rate (e.g., downconvert) than received from the wireless device. In other implementations, the audio data may not be transcoded. Although transcoding (e.g., decoding and encoding) is illustrated as being performed by a transcoder 910, the transcoding operations (e.g., decoding and encoding) may be performed by multiple components of the base station 900. For example, decoding may be performed by the receiver data processor 964 and encoding may be performed by the transmission data processor 982. In other implementations, the processor 906 may provide the audio data to the media gateway 970 for conversion to another transmission protocol, coding scheme, or both. The media gateway 970 may provide the converted data to another base station or core network via the network connection 960.

Encoded audio data generated at the encoder 114, such as transcoded data, may be provided to the transmission data processor 982 or the network connection 960 via the processor 906. The transcoded audio data from the transcoder 910 may be provided to the transmission data processor 982 for coding according to a modulation scheme, such as OFDM, to generate the modulation symbols. The transmission data processor 982 may provide the modulation symbols to the transmission MIMO processor 984 for further processing and beamforming. The transmission MIMO processor 984 may apply beamforming weights and may provide the modulation symbols to one or more antennas of the array of antennas, such as the first antenna 942 via the first transceiver 952. Thus, the base station 900 may provide a transcoded data stream 916, that corresponds to the data stream 914 received from the wireless device, to another wireless device. The transcoded data stream 916 may have a different encoding format, data rate, or both, than the data stream 914. In other implementations, the transcoded data stream 916 may be provided to the network connection 960 for transmission to another base station or a core network.

Those of skill would further appreciate that the various illustrative logical blocks, configurations, modules, circuits, and algorithm steps described in connection with the implementations disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:

a receiver configured to receive a bitstream that includes an encoded mid signal and encoded stereo parameter information, the encoded stereo parameter information representing:

a first value of a stereo parameter, the first value associated with a first frequency range; and a second value of the stereo parameter, the second value associated with a second frequency;

a mid signal decoder configured to decode the encoded mid signal to generate a decoded mid signal;

a transform unit configured to perform a transform operation on the decoded mid signal to generate a frequency-domain decoded mid signal;

a stereo decoder configured to decode the encoded stereo parameter information to determine the first value and the second value;

a stereo parameter conditioner configured to perform a conditioning operation on the first value and the second value to generate a conditioned value of the stereo parameter, the conditioned value associated with a particular frequency range that is a subset of the first frequency range or a subset of the second frequency range;

an up-mixer configured to perform an up-mix operation on the frequency-domain decoded mid signal to generate a first frequency-domain output signal and a second frequency-domain output signal, the conditioned value applied to the frequency-domain decoded mid signal during the up-mix operation; and an output device configured to output a first output signal and a second output signal, the first output signal based on the first frequency-domain output signal and the second output signal based on the second frequency-domain output signal.

2. The apparatus of claim 1, wherein, to perform the conditioning operation, the stereo parameter conditioner is configured to apply an estimation function to the first value and the second value.

3. The apparatus of claim 2, wherein the estimation function comprises an averaging function, an adjustment function, or a curve-fitting function.

4. The apparatus of claim 1, wherein the particular frequency range is a subset of the first frequency range, and wherein the conditioned value is distinct from the first value.

5. The apparatus of claim 1, wherein the stereo parameter conditioner is further configured to generate one or more additional conditional values of the stereo parameter based on the conditioning operation, each conditional value of the one or more additional conditional values associated with a corresponding frequency range that is a subset of the first frequency range or a subset of the second frequency range.

6. The apparatus of claim 1, wherein the particular frequency range is a subset of the first frequency range, and wherein the first value is associated with another subset of the first frequency range.

7. The apparatus of claim 1, wherein the particular frequency range is a subset of the second frequency range, and wherein the second value is associated with another subset of the second frequency range.

8. The apparatus of claim 1, further comprising:

a first inverse transform unit configured to perform a first inverse transform operation on the first frequency-domain output signal to generate the first output signal; and a second inverse transform unit configured to perform a second inverse transform operation on the second frequency-domain output signal to generate the second output signal.

9. The apparatus of claim 1, wherein the bitstream also includes an encoded side signal, and further comprising:

a side signal decoder configured to decode the encoded side signal to generate a decoded side signal; and a second transform unit configured to perform a second transform operation on the decoded side signal to generate a frequency-domain decoded side signal.

10. The apparatus of claim 9, wherein the conditioned value is further applied to the frequency-domain decoded side signal during the up-mix operation.

11. The apparatus of claim 1, wherein the stereo parameter conditioner and the up-mixer are integrated into a mobile device.

12. The apparatus of claim 1, wherein the stereo parameter conditioner and the up-mixer are integrated into a base station.

13. A method comprising:

receiving, at a decoder, a bitstream that includes an encoded mid signal and encoded stereo parameter information, the encoded stereo parameter information representing:

a first value of a stereo parameter, the first value associated with a first frequency range; and a second value of the stereo parameter, the second value associated with a second frequency range;

decoding the encoded mid signal to generate a decoded mid signal;

performing a transform operation on the decoded mid signal to generate a frequency-domain decoded mid signal;

decoding the encoded stereo parameter information to determine the first value and the second value;

performing a conditioning operation on the first value and the second value to generate a conditioned value of the stereo parameter, the conditioned value associated with a particular frequency range that is a subset of the first frequency range or a subset of the second frequency range;

performing an up-mix operation on the frequency-domain decoded mid signal to generate a first frequency-domain output signal and a second frequency-domain output signal, the conditioned value applied to the frequency-domain decoded mid signal during the up-mix operation; and outputting a first output signal and a second output signal, the first output signal based on the first frequency-domain output signal and the second output signal based on the second frequency-domain output signal.

14. The method of claim 13, wherein performing the conditioning operation comprises applying an estimation function to the first value and the second value.

15. The method of claim 13, wherein the particular frequency range is a subset of the first frequency range, and wherein the conditioned value is distinct from the first value.

16. The method of claim 13, further comprising generating one or more additional conditional values of the stereo parameter based on the conditioning operation, each conditional value of the one or more additional conditional values associated with a corresponding frequency range that is a subset of the first frequency range or a subset of the second frequency range.

17. The method of claim 13, further comprising:

performing a first inverse transform operation on the first frequency-domain output signal to generate the first output signal; and performing a second inverse transform operation on the second frequency-domain output signal to generate the second output signal.

18. The method of claim 13, wherein the bitstream also includes an encoded side signal, and further comprising:

decoding the encoded side signal to generate a decoded side signal; and performing a second transform operation on the decoded side signal to generate a frequency-domain decoded side signal.

19. The method of claim 18, wherein the conditioned value is further applied to the frequency-domain decoded side signal during the up-mix operation.

20. The method of claim 13, wherein the conditioning operation and the up-mix operation are performed at a mobile device.

* * * * *